US009610513B2

(12) United States Patent
Ganz

(10) Patent No.: US 9,610,513 B2
(45) Date of Patent: *Apr. 4, 2017

(54) SYSTEM AND METHOD FOR TOY ADOPTION AND MARKETING

(71) Applicant: GANZ, Woodbridge (CA)

(72) Inventor: Howard Ganz, North York (CA)

(73) Assignee: GANZ, Woodbridge, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 14/031,292

(22) Filed: Sep. 19, 2013

(65) Prior Publication Data

US 2014/0017969 A1 Jan. 16, 2014

Related U.S. Application Data

(60) Division of application No. 12/975,481, filed on Dec. 22, 2010, now Pat. No. 8,641,471, which is a continuation of application No. 12/360,222, filed on Jan. 27, 2009, now Pat. No. 8,002,605, which is a continuation of application No. 11/027,880, filed on Dec. 30, 2004, now Pat. No. 7,677,948.

(60) Provisional application No. 60/533,591, filed on Dec. 31, 2003, provisional application No. 60/533,634, filed on Dec. 31, 2003.

(51) Int. Cl.
| | |
|---|---|
| *A63H 30/00* | (2006.01) |
| *A63H 3/36* | (2006.01) |
| *G06Q 30/02* | (2012.01) |
| *A63H 33/00* | (2006.01) |

(52) U.S. Cl.
CPC ............... *A63H 3/36* (2013.01); *A63H 33/00* (2013.01); *G06Q 30/02* (2013.01)

(58) Field of Classification Search
USPC .............................. 446/175; 463/42; 715/706
See application file for complete search history.

(56) References Cited

U.S. PATENT DOCUMENTS

| | | | |
|---|---|---|---|
| 5,255,834 | A | 10/1993 | Bendersky |
| 5,411,259 | A | 5/1995 | Pearson |
| 5,544,320 | A | 8/1996 | Konrad |
| 5,606,652 | A | 2/1997 | Silverbrook |

(Continued)

FOREIGN PATENT DOCUMENTS

| | | |
|---|---|---|
| CA | 2 475 463 A1 | 8/2003 |
| DE | 103 04 779 A1 | 9/2003 |

(Continued)

OTHER PUBLICATIONS

Search Report—AU-2009202831, dated Jan. 12, 2011.

(Continued)

*Primary Examiner* — Masud Ahmed
(74) *Attorney, Agent, or Firm* — Pearne & Gordon LLP

(57) ABSTRACT

A toy is represented on a website via a virtual replica of the product. The toy has a registration data associated with it that is electronically stored in the toy using an electronic storage medium. A user is registered on the website by associating the user with a user ID. The user ID is associated with the virtual replica of the product by utilizing the registration data. Access is granted to one or more features on the website in connection with the virtual replica of the product subsequent to input and validation of the registration code via the user ID without requiring additional entry of the registration data.

8 Claims, 37 Drawing Sheets

(56) References Cited

U.S. PATENT DOCUMENTS

| | | |
|---|---|---|
| 5,659,692 A | 8/1997 | Poggio et al. |
| 5,682,469 A | 10/1997 | Linnett et al. |
| 5,684,943 A | 11/1997 | Abraham |
| 5,717,869 A | 2/1998 | Moran et al. |
| 5,736,982 A | 4/1998 | Suzuki et al. |
| 5,802,296 A | 9/1998 | Morse et al. |
| 5,822,428 A | 10/1998 | Gardner |
| 5,853,327 A | 12/1998 | Gilboa |
| 5,880,731 A | 3/1999 | Liles et al. |
| 5,886,697 A | 3/1999 | Naughton et al. |
| 5,890,963 A | 4/1999 | Yen |
| 5,923,330 A | 7/1999 | Tarlton |
| 5,926,179 A | 7/1999 | Matsuda et al. |
| 5,956,038 A | 9/1999 | Rekimoto |
| 5,959,281 A | 9/1999 | Domiteaux |
| 5,964,660 A | 10/1999 | James et al. |
| 5,966,526 A | 10/1999 | Yokoi |
| 6,009,458 A | 12/1999 | Hawkins et al. |
| 6,012,961 A | 1/2000 | Sharpe, III et al. |
| 6,031,549 A | 2/2000 | Hayes-Roth |
| 6,049,778 A | 4/2000 | Walker et al. |
| 6,057,856 A | 5/2000 | Miyashita et al. |
| 6,072,466 A | 6/2000 | Shah et al. |
| 6,081,830 A | 6/2000 | Schindler |
| 6,159,101 A | 12/2000 | Simpson |
| 6,173,267 B1 | 1/2001 | Cairns |
| 6,175,857 B1 | 1/2001 | Hachiya et al. |
| 6,200,216 B1 | 3/2001 | Peppel |
| 6,210,272 B1 | 4/2001 | Brown |
| 6,219,045 B1 | 4/2001 | Leahy et al. |
| 6,227,931 B1 | 5/2001 | Shackelford |
| 6,227,966 B1 | 5/2001 | Yokoi |
| 6,251,017 B1 | 6/2001 | Leason et al. |
| 6,253,167 B1 | 6/2001 | Matsuda et al. |
| 6,256,043 B1 | 7/2001 | Aho et al. |
| 6,267,672 B1 | 7/2001 | Vance |
| 6,268,872 B1 | 7/2001 | Matsuda et al. |
| 6,273,815 B1 | 8/2001 | Stuckman |
| 6,290,565 B1 | 9/2001 | Galyean III et al. |
| 6,290,566 B1 | 9/2001 | Gabai et al. |
| 6,311,195 B1 | 10/2001 | Hachiya et al. |
| 6,349,301 B1 | 2/2002 | Mitchell et al. |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,388,665 B1 | 5/2002 | Linnett et al. |
| 6,394,872 B1 | 5/2002 | Watanabe |
| 6,404,438 B1 | 6/2002 | Hatlelid et al. |
| 6,406,370 B1 | 6/2002 | Kumagai |
| 6,449,518 B1 | 9/2002 | Yokoo et al. |
| 6,468,155 B1 | 10/2002 | Zucker et al. |
| 6,476,830 B1 | 11/2002 | Farmer et al. |
| 6,493,001 B1 | 12/2002 | Takagi et al. |
| 6,494,762 B1 | 12/2002 | Bushmitch et al. |
| 6,519,771 B1 | 2/2003 | Zenith |
| 6,522,333 B1 | 2/2003 | Hatlelid et al. |
| 6,539,400 B1 | 3/2003 | Bloomfield et al. |
| 6,554,679 B1 | 4/2003 | Shackelford et al. |
| 6,559,863 B1 | 5/2003 | Megiddo |
| 6,560,511 B1 | 5/2003 | Yokoo et al. |
| 6,572,431 B1 | 6/2003 | Maa |
| 6,574,606 B1 | 6/2003 | Bell et al. |
| 6,587,834 B1 | 7/2003 | Dixon, III |
| 6,595,858 B1 | 7/2003 | Tajiri |
| 6,609,968 B1 | 8/2003 | Okada et al. |
| 6,612,501 B1 | 9/2003 | Woll et al. |
| 6,616,532 B2 | 9/2003 | Albrecht |
| 6,650,761 B1 | 11/2003 | Rodriguez et al. |
| 6,663,105 B1 | 12/2003 | Sullivan et al. |
| 6,685,565 B2 | 2/2004 | Tanibuchi et al. |
| 6,692,360 B2 | 2/2004 | Kusuda et al. |
| 6,704,784 B2 | 3/2004 | Matsuda et al. |
| 6,719,604 B2 | 4/2004 | Chan |
| 6,720,949 B1 | 4/2004 | Pryor et al. |
| 6,722,973 B2 | 4/2004 | Akaishi |
| 6,727,925 B1 | 4/2004 | Bourdelais |
| 6,729,884 B1 | 5/2004 | Kelton et al. |
| 6,734,884 B1 | 5/2004 | Berry |
| 6,734,885 B1 | 5/2004 | Matsuda |
| 6,735,324 B1 | 5/2004 | McKinley et al. |
| 6,739,941 B1 | 5/2004 | Brownsberger |
| 6,758,678 B2 | 7/2004 | Van Gilder |
| 6,772,195 B1 | 8/2004 | Hatlelid et al. |
| 6,773,325 B1 | 8/2004 | Mawle et al. |
| 6,773,344 B1 | 8/2004 | Gabai et al. |
| 6,800,013 B2 | 10/2004 | Liu |
| 6,813,605 B2 | 11/2004 | Nakamura et al. |
| 6,845,486 B2 | 1/2005 | Yamada et al. |
| 6,890,179 B2 | 5/2005 | Rogan et al. |
| 6,899,333 B2 | 5/2005 | Weisman |
| 6,910,186 B2 | 6/2005 | Kim |
| 6,918,833 B2 | 7/2005 | Emmerson et al. |
| 6,944,421 B2 | 9/2005 | Axelrod |
| 6,951,516 B1 | 10/2005 | Eguchi et al. |
| 6,954,728 B1 | 10/2005 | Kusumoto et al. |
| 6,959,166 B1 | 10/2005 | Gabai et al. |
| 7,012,602 B2 | 3/2006 | Watson et al. |
| 7,037,166 B2 | 5/2006 | Shrock et al. |
| 7,039,940 B2 | 5/2006 | Weatherford |
| 7,042,440 B2 | 5/2006 | Pryor et al. |
| 7,054,831 B2 | 5/2006 | Koenig |
| 7,058,897 B2 | 6/2006 | Matsuda |
| 7,061,493 B1 | 6/2006 | Cook et al. |
| 7,062,722 B1 | 6/2006 | Carlin et al. |
| 7,066,781 B2 | 6/2006 | Weston |
| 7,076,445 B1 | 7/2006 | Cartwright |
| 7,081,033 B1 | 7/2006 | Mawle et al. |
| 7,086,005 B1 | 8/2006 | Matsuda |
| 7,089,083 B2 | 8/2006 | Yokoo et al. |
| 7,143,358 B1 | 11/2006 | Yuen |
| 7,155,680 B2 | 12/2006 | Akazawa et al. |
| 7,168,051 B2 | 1/2007 | Robinson et al. |
| 7,171,154 B2 | 1/2007 | Fujisawa |
| 7,179,171 B2 | 2/2007 | Forlines et al. |
| 7,181,690 B1 | 2/2007 | Leahy et al. |
| 7,191,220 B2 | 3/2007 | Ohwa |
| 7,208,669 B2 | 4/2007 | Wells et al. |
| 7,229,288 B2 | 6/2007 | Stuart et al. |
| 7,249,139 B2 | 7/2007 | Chuah et al. |
| 7,266,522 B2 | 9/2007 | Dutta et al. |
| 7,288,028 B2 | 10/2007 | Rodriquez et al. |
| 7,314,407 B1 | 1/2008 | Pearson |
| 7,425,169 B2 | 9/2008 | Ganz |
| 7,442,108 B2 | 10/2008 | Ganz |
| 7,448,231 B2 | 11/2008 | Jeanvoine et al. |
| 7,465,212 B2 | 12/2008 | Ganz |
| 7,478,047 B2 | 1/2009 | Loyall et al. |
| 7,488,231 B2 | 2/2009 | Weston |
| 7,534,157 B2 | 5/2009 | Ganz |
| 7,548,242 B1 | 6/2009 | Hughes et al. |
| 7,568,964 B2 | 8/2009 | Ganz |
| 7,604,525 B2 | 10/2009 | Ganz |
| 7,618,303 B2 | 11/2009 | Ganz |
| 7,677,948 B2 | 3/2010 | Ganz |
| 7,789,726 B2 | 9/2010 | Ganz |
| 7,850,527 B2 | 12/2010 | Barney et al. |
| 7,908,324 B2 | 3/2011 | Shochet et al. |
| 9,132,344 B2 | 9/2015 | Borge |
| 9,238,171 B2 | 1/2016 | Ganz |
| 2001/0020955 A1 | 9/2001 | Nakagawa |
| 2001/0031603 A1 | 10/2001 | Gabai et al. |
| 2001/0037304 A1 | 11/2001 | Paiz |
| 2001/0039206 A1 | 11/2001 | Peppel |
| 2002/0002514 A1 | 1/2002 | Kamachi et al. |
| 2002/0022523 A1 | 2/2002 | Dan et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0026357 A1 | 2/2002 | Miller et al. |
| 2002/0026358 A1 | 2/2002 | Miller et al. |
| 2002/0036617 A1 | 3/2002 | Pryor |
| 2002/0040327 A1 | 4/2002 | Owa |
| 2002/0054094 A1 | 5/2002 | Matsuda |
| 2002/0065746 A1 | 5/2002 | Lewis |

(56) References Cited

U.S. PATENT DOCUMENTS

| | | |
|---|---|---|
| 2002/0065890 A1 | 5/2002 | Barron |
| 2002/0068500 A1 | 6/2002 | Gabai et al. |
| 2002/0082077 A1 | 6/2002 | Johnson et al. |
| 2002/0090985 A1 | 7/2002 | Tochner et al. |
| 2002/0094851 A1 | 7/2002 | Rheey |
| 2002/0111808 A1 | 8/2002 | Feinberg |
| 2002/0113809 A1 | 8/2002 | Akazawa et al. |
| 2002/0119810 A1 | 8/2002 | Takatsuka et al. |
| 2002/0130894 A1 | 9/2002 | Young |
| 2002/0147640 A1 | 10/2002 | Daniele |
| 2002/0160835 A1 | 10/2002 | Fujioka et al. |
| 2002/0161666 A1 | 10/2002 | Fraki et al. |
| 2002/0168919 A1 | 11/2002 | Perkins |
| 2002/0169668 A1 | 11/2002 | Bank et al. |
| 2002/0169672 A1 | 11/2002 | Barnhart |
| 2002/0183119 A1 | 12/2002 | Fessler |
| 2002/0198781 A1 | 12/2002 | Cobley |
| 2002/0198940 A1 | 12/2002 | Bower et al. |
| 2003/0004889 A1 | 1/2003 | Fiala |
| 2003/0018523 A1 | 1/2003 | Rappaport |
| 2003/0034955 A1 | 2/2003 | Gilder |
| 2003/0055984 A1 | 3/2003 | Shimakawa et al. |
| 2003/0061161 A1 | 3/2003 | Black |
| 2003/0088467 A1 | 5/2003 | Culver |
| 2003/0126031 A1 | 7/2003 | Asami |
| 2003/0220885 A1 | 11/2003 | Lucarelli |
| 2003/0222902 A1 | 12/2003 | Chupin et al. |
| 2003/0232649 A1 | 12/2003 | Gizis |
| 2004/0030595 A1 | 2/2004 | Park et al. |
| 2004/0043806 A1 | 3/2004 | Kirby |
| 2004/0046736 A1 | 3/2004 | Pryor et al. |
| 2004/0053690 A1 | 3/2004 | Fogel et al. |
| 2004/0075677 A1 | 4/2004 | Loyall et al. |
| 2004/0092311 A1 | 5/2004 | Weston |
| 2004/0093266 A1 | 5/2004 | Dohring |
| 2004/0153557 A1 | 8/2004 | Shochet et al. |
| 2004/0189702 A1 | 9/2004 | Hlavac et al. |
| 2004/0193489 A1 | 9/2004 | Boyd et al. |
| 2004/0219961 A1 | 11/2004 | Ellenby et al. |
| 2004/0229696 A1 | 11/2004 | Beck |
| 2004/0242326 A1 | 12/2004 | Fujisawa |
| 2004/0259465 A1 | 12/2004 | Wright et al. |
| 2005/0043076 A1 | 2/2005 | Lin |
| 2005/0049725 A1 | 3/2005 | Huang |
| 2005/0059483 A1 | 3/2005 | Borge |
| 2005/0071225 A1 | 3/2005 | Bortolin et al. |
| 2005/0114272 A1 | 5/2005 | Herrmann et al. |
| 2005/0137015 A1 | 6/2005 | Rogers et al. |
| 2005/0192864 A1 | 9/2005 | Ganz |
| 2005/0250415 A1 | 11/2005 | Barthold |
| 2005/0250416 A1 | 11/2005 | Barthold |
| 2005/0272504 A1 | 12/2005 | Eguchi et al. |
| 2005/0287925 A1 | 12/2005 | Proch et al. |
| 2006/0035692 A1 | 2/2006 | Kirby |
| 2006/0079150 A1 | 4/2006 | Filoseta et al. |
| 2006/0080539 A1 | 4/2006 | Asami et al. |
| 2006/0093142 A1 | 5/2006 | Schneier et al. |
| 2006/0166593 A1 | 7/2006 | Shrock et al. |
| 2006/0285441 A1 | 12/2006 | Walker et al. |
| 2007/0050716 A1 | 3/2007 | Leahy et al. |
| 2007/0143679 A1 | 6/2007 | Resner |
| 2008/0009350 A1 | 1/2008 | Ganz |
| 2008/0009351 A1 | 1/2008 | Ganz |
| 2008/0109313 A1 | 5/2008 | Ganz |
| 2008/0134099 A1 | 6/2008 | Ganz |
| 2008/0163055 A1 | 7/2008 | Ganz |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0131164 A1 | 5/2009 | Ganz |
| 2009/0204420 A1 | 8/2009 | Ganz |
| 2010/0151940 A1 | 6/2010 | Borge |

FOREIGN PATENT DOCUMENTS

| | | |
|---|---|---|
| EP | 0 971 302 A1 | 1/2000 |
| EP | 1 228 792 A1 | 8/2002 |
| GB | 2365364 | 2/2002 |
| JP | 2000-57373 A | 2/2000 |
| JP | 2001-222585 A | 8/2001 |
| JP | 2001222585 | 8/2001 |
| JP | 2001-283024 A | 10/2001 |
| JP | 2001-321571 A | 11/2001 |
| JP | 2002-016171 A | 1/2002 |
| JP | 2002063092 | 2/2002 |
| JP | 2002-297498 A | 10/2002 |
| JP | 2003-016035 A | 1/2003 |
| JP | 2002-134481 A | 7/2003 |
| JP | 2003-205178 A | 7/2003 |
| JP | 2003-210843 A | 7/2003 |
| JP | 2003-242058 A | 8/2003 |
| JP | 2003-248650 A | 9/2003 |
| KR | 20010073524 A | 8/2001 |
| WO | 99/42917 A2 | 8/1999 |
| WO | 9950733 A2 | 10/1999 |
| WO | 00/33533 A1 | 6/2000 |
| WO | 0104852 A1 | 1/2001 |
| WO | 01/69572 A1 | 9/2001 |
| WO | 01/69829 A2 | 9/2001 |
| WO | 01/69830 A2 | 9/2001 |
| WO | 01/90841 A2 | 11/2001 |
| WO | 02/22224 A1 | 3/2002 |
| WO | 0221407 A1 | 3/2002 |
| WO | 02/27591 A1 | 4/2002 |
| WO | 02/054327 A1 | 7/2002 |
| WO | 02079925 A2 | 10/2002 |
| WO | 02/099581 A2 | 12/2002 |
| WO | 03/026764 A2 | 4/2003 |
| WO | 03/034303 A1 | 4/2003 |
| WO | 03071389 A2 | 8/2003 |
| WO | 2005/064502 A1 | 7/2005 |

OTHER PUBLICATIONS

Search Report—AU-2009202829, dated Jan. 4, 2011.
Search Report—AU-2009202828, dated Jan. 13, 2011.
USPTO Communication Form for Ex Partes Reexamination of U.S. Pat. No. 7,568,964 dated Nov. 12, 2010.
U.S. Copyright Registrations for The Sims expansion packs, Dec. 31, 2000.
The Sims: News, "Details about Makin Magic," Jul. 11, 2003.
The Neopian Times, Week 42 retrieved Mar. 25, 2010.
The Neopian Times, Week 32 retrieved Mar. 25, 2010.
The Helpful Neopian retrieved Mar. 25, 2010.
Telecomworldwire, "Product Sidewire," Oct. 1995.
Second Request for Reexamination of U.S. Pat. No. 7,618,303—with Exhibits B, C, D, E, F, L, M dated Aug. 24, 2010.
Search Report—CA2665737, dated Oct. 26, 2010.
Search Report for PCT/CA2004/002206 dated May, 2, 2005.
Right of Appeal notice for Inter Partes Reexamination of U.S. Pat. No. 7,677,948 dated Jan. 18, 2011.
Right of Appeal notice for Inter Partes Reexamination of U.S. Pat. No. 7,568,964 dated Jan. 15, 2011.
Request for Reexamination of U.S. Pat. No. 7,677,948—with Exhibits B, C, D, E, O, P, Q, R, S, and T dated Apr. 20, 2010.
Request for Reexamination of U.S. Pat. No. 7,618,303—with Exhibits B, C, D, E, M, N, and O dated Apr. 20, 2010.
Request for Reexamination of U.S. Pat. No. 7,604,525—with Exhibits H, I, J, K, L, X, and Y dated Apr. 20, 2010.
Request for Reexamination of U.S. Pat. No. 7,568,964—with Exhibits B, C, N, O, R, S dated Apr. 20, 2010.
Request for ExParte Reexamination of U.S. Pat. No. 7,568,964—no exhibits dated Nov. 1, 2010.
Prima's Official Strategy Guide—The Sims, dated 2000.
Pojo's Unofficial Guide to Neopets, 2003.
Petition to Review Denial for Ex Partes Reexamination of U.S. Pat. No. 7,568,964 dated Jan. 6, 2011.
PC Magazine, "The Sims Online Arrives," dated Dec. 18, 2002.

(56) References Cited

OTHER PUBLICATIONS

Order Granting Request for Inter Partes Reexamination of U.S. Pat. No. 7,677,948 dated Jul. 9, 2010.
Order Granting Request for Inter Partes Reexamination of U.S. Pat. No. 7,618,303 Nov. 8, 2010.
Order Granting Request for Inter Partes Reexamination of U.S. Pat. No. 7,604,525 dated Jul. 9, 2010.
Order Granting Request for Inter Partes Reexamination of U.S. Pat. No. 7,568,964 dated Jul. 10, 2010.
Order Denying Ex Partes Reexamination of U.S. Pat. No. 7,568,964 dated Dec. 10, 2010.
Office action for Inter Partes Reexamination of U.S. Pat. No. 7,618,303—dated Dec. 17, 2010.
Office action for Inter Partes Reexamination of U.S. Pat. No. 7,604,525—dated Aug. 19, 2010.
Notice of Termination of Inter Partes Reexamination of U.S. Pat. No. 7,618,303, dated Sep. 30, 2010.
Notice of Appeal in Inter Partes Reexamination of of U.S. Pat. No. 7,677,948 dated Feb. 17, 2011.
Notice of Appeal in Inter Partes Reexamination of of U.S. Pat. No. 7,568,964 dated Feb. 10, 2011.
Nothing But Neopets, "Neopian History.", retrieved Mar. 24, 2010.
Nothing But Neopets, "Dec. 2002.".
Neopian Hospital, retrieved Mar. 24, 2010.
Neopets-Archeology, retrieved Mar. 25, 2010.
Neopets The Official Magazine, dated Nov. 18, 2003.
Neopet Nation, Mar. 13, 2003.
monopets.com, registration, Dec. 12, 2002.
Monopets, "The Gurgle," plush toy, undated, (photographs taken Aug. 2007).
M2 Presswire, UltraCorps—second premium title for the Internet Gaming Zone "Oblivion," May 1998.
Johnson, "Sympathetic Interfaces," 1999.
Japanese Patent Office, Decision of Refusal, JP App No. 2006-545875, Dated Feb. 18, 2009.
Intl Search Report—PCT-CA2009-000271 dated Sep. 7, 2010.
http://www.lego.com, Feb. 6, 2003, www.archive.org.
http://web.archive.org.web.20031202190119/www.monopets.com/, Dec. 2, 2003.
Grace, "Web site tycoon's next goal: sixth grade", dated Jun. 19, 2002.
Decision Vacating Inter Partes Reexamination of U.S. Pat. No. 7,618,303, dated Jun. 30, 2010.
CNET News, "Who Let the Neopets out?," dated Feb. 26, 2002.
Amendment and Response to Office action for Inter Partes Reexamination of U.S. Pat. No. 7,604,525, dated Oct. 19, 2010.
Action Closing Prosecution of Inter Partes Reexamination of U.S. Pat. No. 7,677,948—dated Sep. 14, 2010.
Action Closing Prosecution of Inter Partes Reexamination of U.S. Pat. No. 7,568,964—dated Sep. 8, 2011.
Action Closing Prosecution for Inter Partes Reexamination of U.S. Pat. No. 7,604,525, dated Feb. 25, 2010.
3rd Party Comments re: Response to Office action for Inter Partes Reexamination of U.S. Pat. No. 7,604,525, dated Nov. 2, 2010.
"The Sims," http://en.wikipedia.org/wiki/, retrieved Feb. 6, 2010.
"The Sims Booklet," dated 2000.
"The Sims 10th Anniversary," http://thesims2.ea.com/, dated Feb. 26, 2010.
"Look Out Pokemon," The Ottawa Citizen, Dated Feb. 7, 2000.
Search Report—CA2696620—Mar. 1, 2011.
Inter Parties Reexamination Certificate for 95/001,343 Issued Apr. 24, 2013.
Examiner's Determination for 95/001,345 Issued May 1, 2013.
Reexamination Request No. 95/001,422—Final Board Decision Issued Jun. 4, 2013.
Reexamination Request No. 95/001,343—NTC of Intent to Issue Reexam Certificate Feb. 27, 2013.
Reexamination Request No. 95/001,422—Board Decision Feb. 13, 2013.
Reexamination Request No. 95/001,422—Patent Owner's Response After Closing Prosecution. Cert of Service Mar. 13, 2013.
Reexamination Request No. 95/001,345—Order Remanding Inter Partes Reexamination to the Examiner Mar. 19, 2013.
Decision on Appeal of Reexamination Request No. 95/001,341, dated Oct. 30, 2012.
Request to Reopen Prosecution of Reexamination Request No. 95/001,341, dated Nov. 30, 2012.
Decision on Appeal of Reexamination Request No. 95/001,343, dated Oct. 30, 2012.
Order Denying Request Reopen of Reexamination Request No. 95/001,345, dated Nov. 7, 2012.
Renewed Request Reopen of Reexamination Request No. 95/001,345, dated Nov. 21, 2012.
Rebuttal Brief of 3rd Party of Reexamination Request No. 95/001,422, dated Sep. 13, 2012.
Rebuttal Brief Entered of Reexamination Request No. 95/001,422, dated Nov. 15, 2012.
Appeal Docketing Notice of Reexamination Request No. 95/001,422, dated Nov. 26, 2012.
Rebuttal Brief of Patent Owner of Reexamination Request No. 95/001,343, dated May 25, 2012.
Decision on Appeal of Reexamination Request No. 95/001,345, dated Jun. 12, 2012.
Extension of Time Petition of Reexamination Request No. 95/001,345, dated Jul. 2, 2012.
Decision on Petition of Reexamination Request No. 95/001,345, dated Jul. 12, 2012.
Request to Reopen Prosecution of Reexamination Request No. 95/001,345, dated Jul. 12, 2012.
Third Party Requestor's Reply to Request of Reexamination Request No. 95/001,345, dated Aug. 9, 2012.
Examiner's Answer of Reexamination Request No. 95/001,422, dated Aug. 15, 2012.
Examiner's Answer of Reexamination Request No. 95/001,341, dated Apr. 12, 2012.
Rebuttal Brief of 3rd Party Requestor of Reexamination Request No. 95/001,341, dated May 10, 2012.
Appellant's Brief of Reexamination Request No. 95/001,343, dated Feb. 14, 2012.
Respondent's Brief of Reexamination Request No. 95/001,343, dated Mar. 8, 2012.
Examiner's Answer of Reexamination Request No. 95/001,343, dated Apr. 25, 2012.
Rebuttal Brief of 3rd Party Requestor of Reexamination Request No. 95/001,345, dated Dec. 14, 2011.
BPAI Docketing Notice of Reexamination Request No. 95/001,345, dated Apr. 9, 2012.
Rebuttal Brief Entry of Reexamination Request No. 95/001,345, dated Mar. 27, 2012.
Right of Appeal Notice of Reexamination Request No. 95/001,422, dated Apr. 2, 2012.
Notice of Appeal by 3rd Party Requestor of Reexamination Request No. 95/001,422, dated Apr. 17, 2012.
Petition for the Director to Review the Denial of Reexamination Request No. 90/011,310, dated Jan. 6, 2011.
Status Inquiry on Petition for the Director to Review the Denial of Reexamination Request No. 90/011,310, dated Jan. 13, 2012.
Denial of Petition for the Director to Review the Denial of Reexamination Request No. 90/011,310, dated Jan. 26, 2012.
Right of Appeal notice for Inter Partes Reexamination of U.S. Pat. No. 7,604,525 dated Nov. 14, 2011.
Examiners Answer for Inter Partes Reexamination of U.S. Pat. No. 7,568,964 dated Nov. 15, 2011.
Action Closing Prosecution for Inter Parties Reexamination of U.S. Pat. No. 7,618,303 dated Nov. 14, 2011.
Reexamination 95/001,422—NTC of Intent to Issue a Reexam Certificate, dated Sep. 30, 2013.
"The Sims Deluxe Edition" www.replacementdocs.com, dated Sep. 17, 2002.
Reexamination 95/001,341—Order Remanding Reexam to Examiner for Consideration, dated Jul. 31, 2013.

(56) References Cited

OTHER PUBLICATIONS

Reexamination 95/011,341—Examiner's Determination, Oct. 18, 2013.
Reexamination 95/011,341—Response After Decision, Nov. 18, 2013.
Reexamination 95/011,341—Declaration of Karl Borst, Nov. 18, 2013.
Reexamination 95/001,345—PTAB Docketing Notice, Dec. 23, 2013.
Reexamination 95/001,345—Notice of Concurrent Proceedings, Dec. 30, 2013.
Reexam Certificate Issued for 95/001,422, dated Oct. 30, 2013.
BPAI Decision on Appeal 11840939, dated Jan. 24, 2014.
BPAI Decision on Appeal 11840940, dated Jan. 24, 2014.
BPAI Decision on Appeal 11859491, dated Jan. 24, 2014.
BPAI Decision on Appeal 11840941, dated Jan. 29, 2014.
Reexamination 95/011,341—PTAB Docketing Notice, Jan. 31, 2014.
Reexamination 95/011,341—PTAB Decision, Apr. 1, 2014.
Reexamination 95/001,345—PTAB Decision, Apr. 1, 2014.
Request for Rehearing 11840939, dated Mar. 24, 2014.
Request for Rehearing 11840940, dated Mar. 24, 2014.
Request for Rehearing 11859491, dated Mar. 24, 2014.
Request for Rehearing 11840941, dated Mar. 29, 2014.
Reexamination 95/011,341—Request for Rehearing, May 1, 2014.
Request for Rehearing—Denied 11840939, dated May 9, 2014.
Request for Rehearing—Denied 11840940, dated May 9, 2014.
Request for Rehearing—Denied 11859491, dated May 9, 2014.
Request for Rehearing—Denied 11840941, dated May 9, 2014.
Notice of Appeal 11840939, dated May 9, 2014.
Notice of Appeal 11840940, dated May 9, 2014.
Notice of Appeal 11840941, dated May 9, 2014.
Notice of Appeal 11859491, dated May 9, 2014.
Reexamination 95/011,345—Reexam Certificate Issued; Dated Sep. 16, 2014.
Reexamination 95/011,341—Decision on Reconsideration—Denied; Dated Apr. 21, 2015.
Reexamination 95/011,341—Notice of Appeal to Federal Circuit; Dated Jun. 22, 2015.
Reexamination 95/011,341—Appellants Motion to Dismiss Appeal; Dated Aug. 18, 2015.
Reexamination 95/011,341—Order Granting Motion to Dismiss; Dated Sep. 3, 2015.

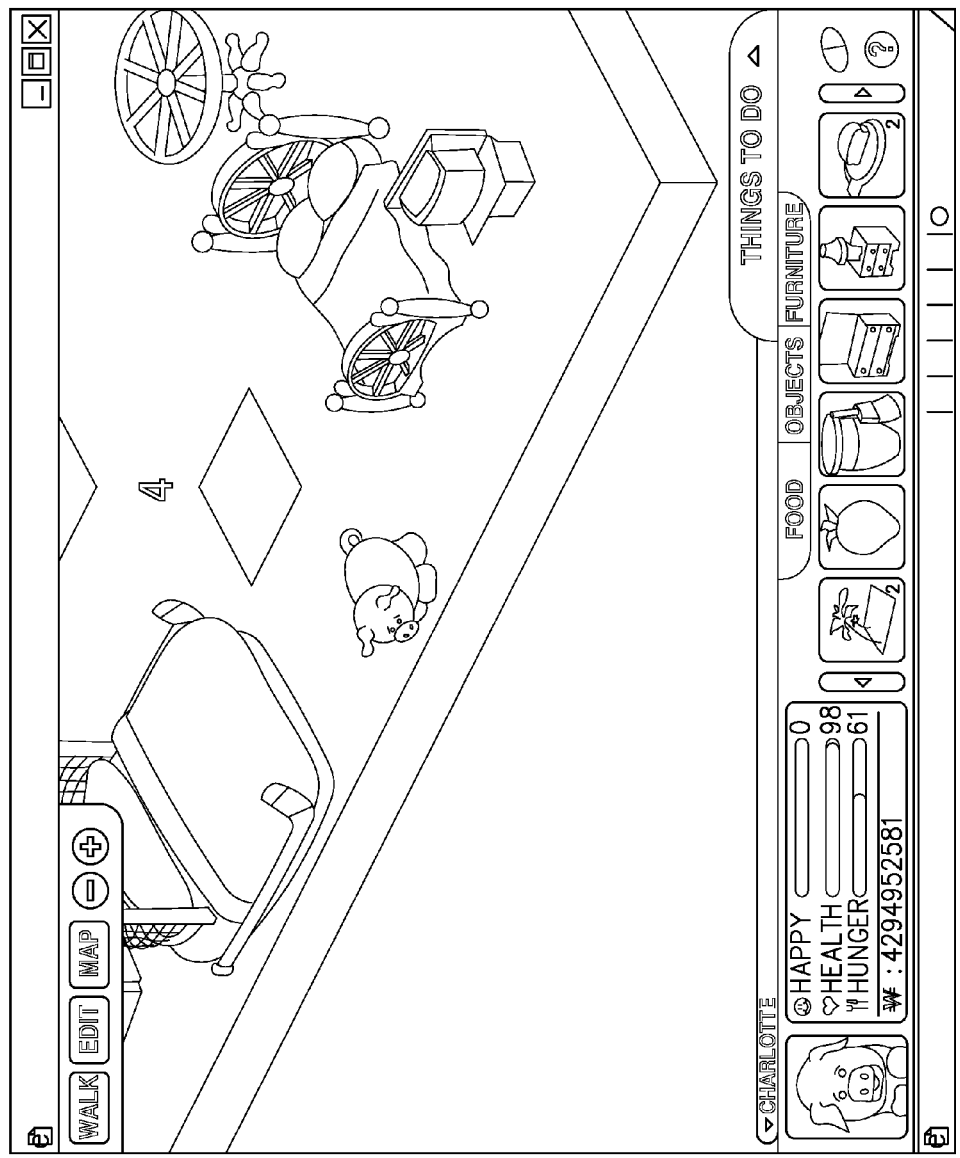

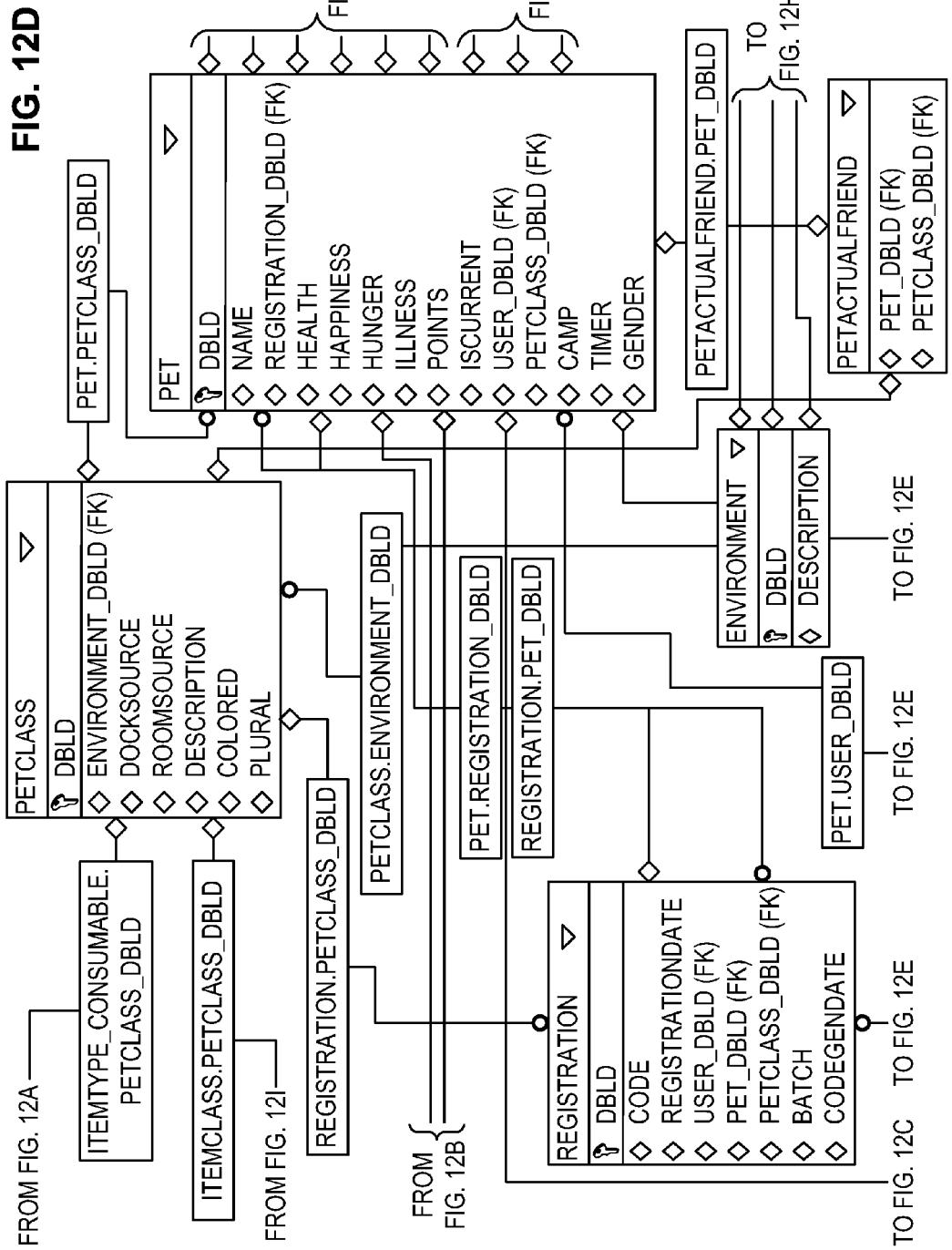

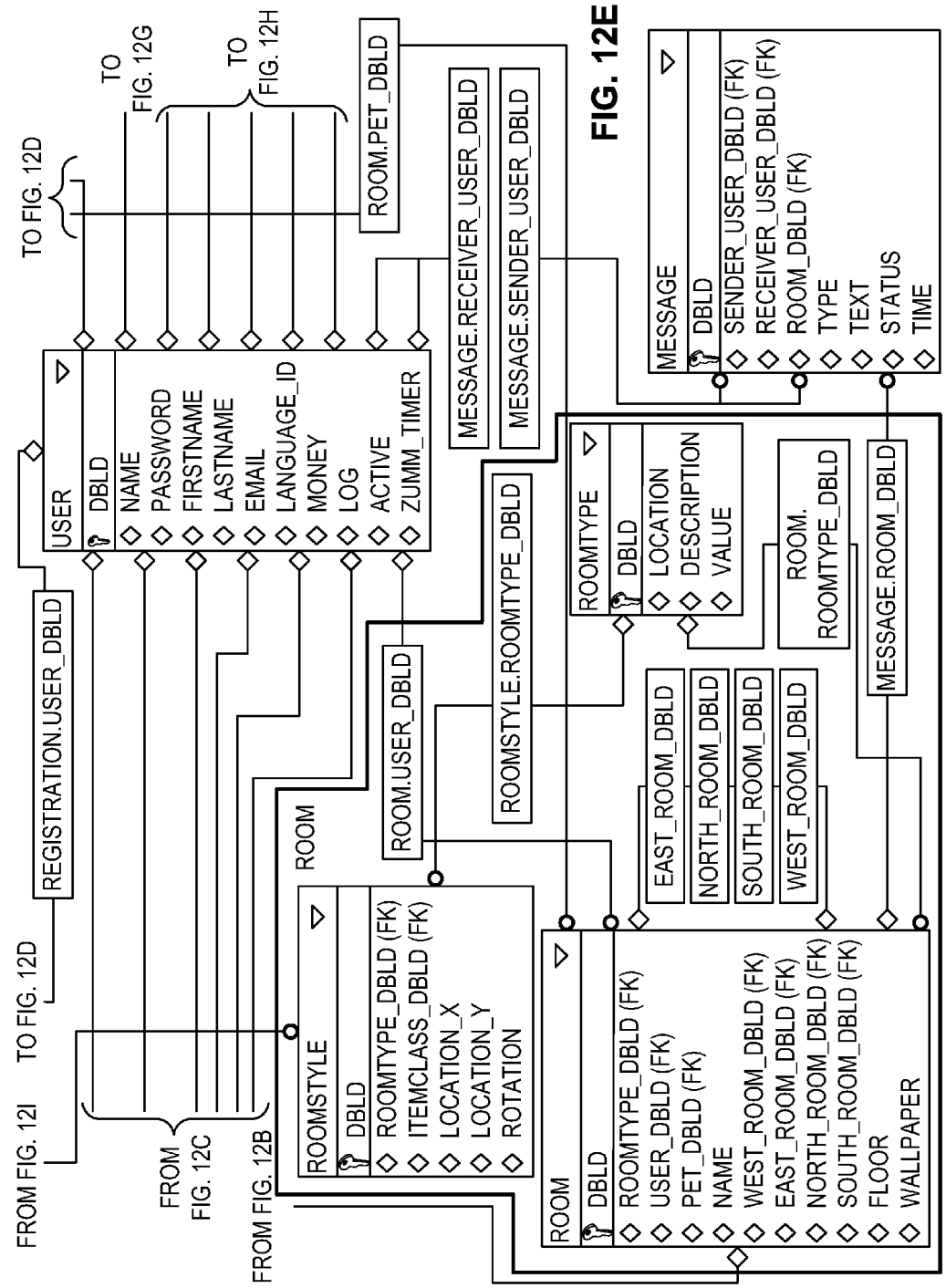

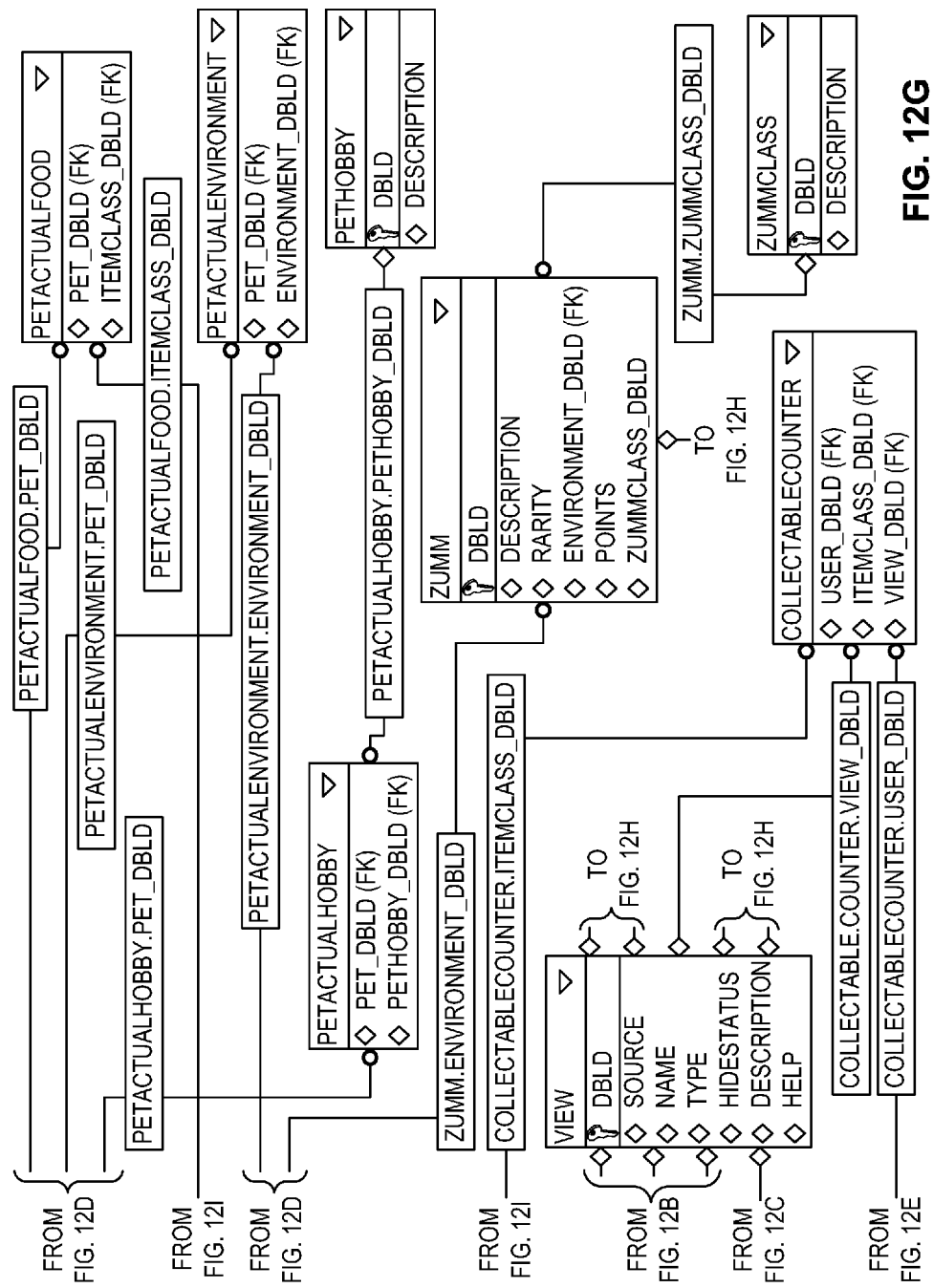

SYSTEM AND METHOD FOR TOY ADOPTION AND MARKETING

CROSS-REFERENCES TO RELATED APPLICATIONS

This is a divisional of application Ser. No. 12/975,481 filed Dec. 22, 2013, which is a continuation of application Ser. No. 12/360,222 filed on Jan. 27, 2009, which is a continuation of application Ser. No. 11/027,880, filed on Dec. 30, 2004, which claims the benefit of provisional application Ser. Nos. 60/533,591 and 60/533,634, both filed on Dec. 31, 2003, all of which are incorporated herein by reference in their entirety.

REFERENCE TO COMPUTER PROGRAM LISTING

A Computer Program Listing Appendix filed on CD ROM in co-pending application Ser. No. 11/027,880, filed on Dec. 30, 2004 is incorporated by reference in its entirety.

FIELD OF THE INVENTION

This application relates generally to a system and method for toy adoption and marketing.

More specifically, this application relates to an Entertainment System including a website, in combination with a commercially purchased toy, wherein the system allows a toy user to register the toy online using a registration code, allowing the user access to various activities and scenarios in a "virtual world" including a virtual representation of the toy, via a computer connected to the Internet.

BACKGROUND OF THE INVENTION

Typically, a consumer purchases a toy (e.g., a stuffed plush animal or other creature, etc.) as a gift for a child, for example, and that child then uses the toy for imaginative activities. However, the toy manufacturer relationship with the toy does not typically continue until the next toy is purchased.

This lack of continuity represents a lost opportunity to take advantage of the fact that the child or other toy owner likely wants to create a whole imaginative world for the toy for play purposes.

A means of creating a such an imaginative world using modern computer tools, such as a personal computer connected to the internet, wherein the toy can be utilized in a computer generated "virtual world" for various games and activities, given a name and a history, and taken care of, would allow the owner a more varied and interactive means of playing with the toy.

Further, such a virtual world could be used to maintain the relationship between the toy owner and the toy manufacturer (or, alternatively a retailer or service provider), allowing new toys, accessories, and services of the manufacturer, retailer, or other provider to be offered to the toy owner, thereby increasing the potential market for the manufacturer and increasing the usage of the toy by the user. Such a virtual world could also provide many educational and gaming scenarios that would engage a child or adult with many hours of play.

Furthermore, such a virtual world could increase the attachment that the toy owner feels for the toy, and thus increase the likelihood that additional toy or accessory purchases would occur, and also increasing the satisfaction the owner feels with the toy, thus extending the relationship between the toy manufacture and the toy owner.

Finally, by engaging the toy owner in the virtual world, advertising and other marketing advantages would likely occur because of the additional satisfaction that the toy would provide, hence leading to potential word-of-mouth and other means of marketing the toy and the website.

Accordingly, a system for creating such a virtual world to take advantage of such marketing potential might provide some or all of the listed benefits.

SUMMARY OF THE INVENTION

Provided is a method for providing a virtual world presentation to a user for entertainment. The method comprises the steps of: storing data relating to a plurality of registration codes, each of the registration codes corresponding to one of a plurality of toys; serving content, via a communication network, to a user computer; receiving one of the registration codes transmitted from the user computer via one or both of the communication network and an additional communication network; verifying the one of the registration codes against the data relating to the plurality of registration codes; registering a toy corresponding to the one of the registration codes after the verifying; and providing virtual world data for including in the content.

The virtual world data of the above method is for use by the user computer to present a virtual world to the user, and the virtual world includes a virtual toy representing the toy.

Also provided is a method for providing a virtual world presentation to a user of a toy for entertainment, comprising the steps of: a user obtaining the toy including a corresponding registration code; serving content, via a communication network, to a user computer; receiving one or both of data and commands from the user computer; verifying the toy to determining a validity of the toy; registering the toy for allowing the user to access a restricted portion of an Entertainment System; and the system providing virtual world data for including in the content.

The virtual world data of the above method is for use by the user computer to present a virtual world to the user, and the virtual world includes a virtual toy representing the toy, and further the virtual world provides a plurality of activities for the user to participate in via interactions with the user computer.

Further provided is an entertainment system for providing a virtual world for entertainment of a user of a toy. The system comprises: a server subsystem for serving content, via a communication network, to a user computer, and for receiving one or both of data and commands from the user computer; a registration subsystem for verifying and then registering the toy, wherein the verifying includes determining a validity of the toy, and wherein the registering is for allowing the user to access a restricted portion of the Entertainment System; and a virtual world providing subsystem for providing virtual world data for including in the content.

The virtual world data of this system is for use by the user computer to present a virtual world to the user, and the virtual world includes a virtual toy representing the toy.

Also provided is an entertainment system for providing a virtual world for user entertainment, which comprises: a storage subsystem for storing data relating to a plurality of registration codes, each of the registration codes corresponding to one of a plurality of toys; a server subsystem for serving content, via a communication network, to a user computer, and for receiving one of the registration codes transmitted from the user computer via one or both of the communication network and an additional communication network; a registration subsystem for verifying the one of the registration codes against the data relating to the plurality of registration codes, and subsequently registering the toy in the system after the verifying; and a virtual world providing subsystem for providing virtual world data for including in the content.

The virtual world data of the above system is for use by the user computer to present a virtual world to the user, and the virtual world includes a virtual toy representing the toy.

Further provided is a toy for utilizing an entertainment system, such as the ones listed above, for providing a virtual world for entertainment of a user of the toy. The toy comprises a toy body and a registration code, and the entertainment system uses the registration code to register and verify the toy. The entertainment system presents a virtual world to the user via a user computer connected to a communication network, and the virtual world includes a virtual toy representing the toy.

Further provided is an Entertainment System as described above, including one or more of the following activities for a user:
 providing a virtual medical checkup for the virtual toy;
 playing a game;
 virtually purchasing virtual furnishings for a virtual room in the virtual world using virtual cash;
 virtually furnishing the virtual room in the virtual world;
 virtually purchasing virtual food for the virtual toy using the virtual cash;
 virtually feeding the virtual toy;
 playing with the virtual toy;
 playing with the virtual toy along with an additional virtual toy representing an additional toy registered by an additional user via interactions by the additional user with an additional user computer;
 virtually adding an additional virtual room in the virtual world; and
 chatting with the additional user using the user computer and the additional user computer.

Still further provided is a computer readable medium for storing computer readable program code for performing the method disclosed herein by utilizing a computer system, as also disclosed herein.

BRIEF DESCRIPTION OF THE DRAWINGS

FIGS. 11A-11J show example screen shots of the website as possibly seen by a user of the system of the current embodiment; and FIG. 12A-12I are a structure diagram of the program code of the current embodiment.

DETAILED DESCRIPTION OF THE PREFERRED EMBODIMENTS

Figure 1:
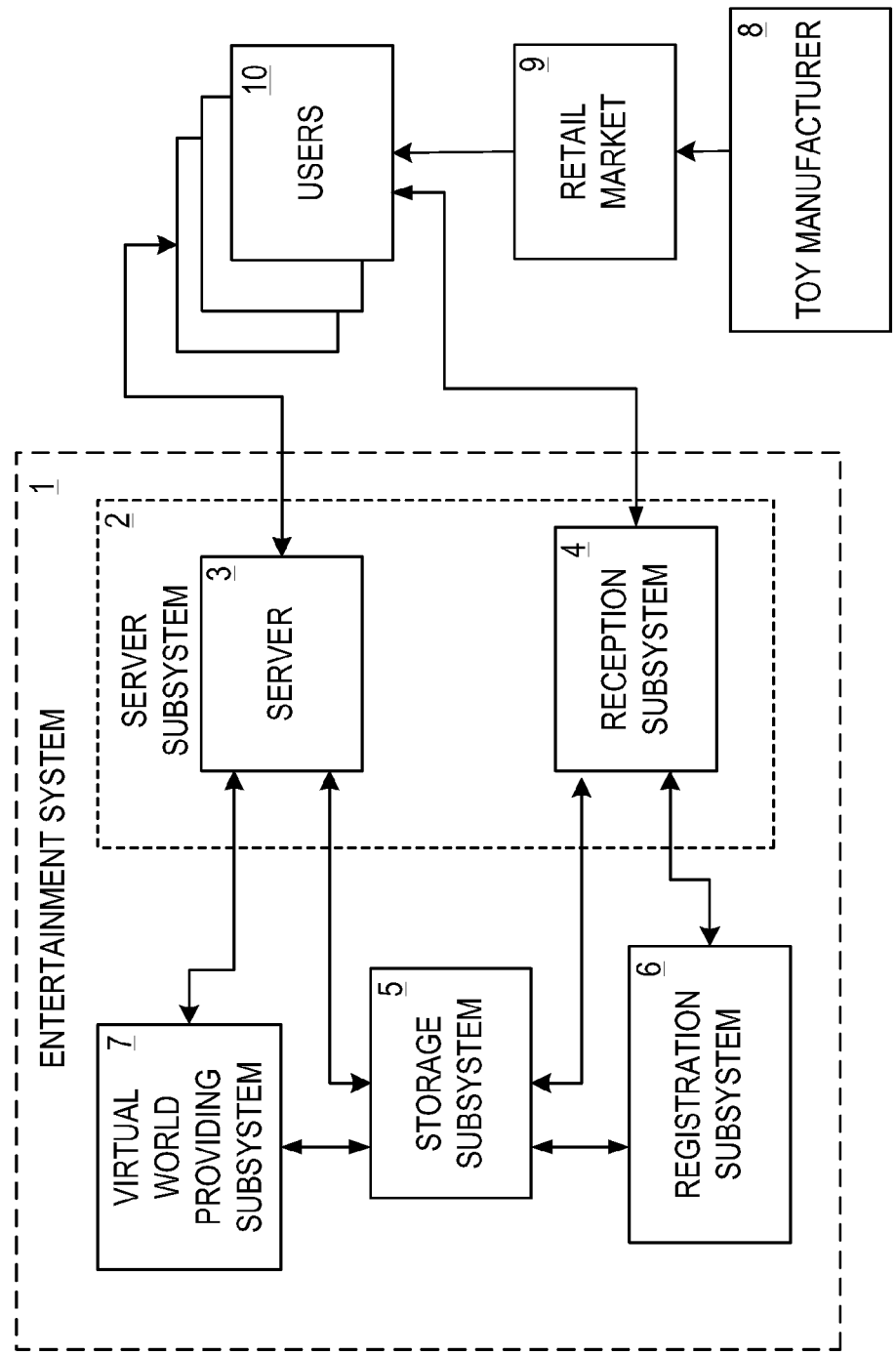
FIG. 1 shows a schematic block diagram of a current embodiment of the system and its interactions with some external entities.

Provided is an Entertainment System including an online "virtual world" where the user of a toy can register the toy using a unique registration number provided with the toy at purchase, adopt the toy online, and play with a virtual representation of the toy (the "virtual toy") in the virtual world. In a current embodiment, mostly as implemented by the software of the Computer Program Listing Appendix, incorporated by reference, the "virtual world" is implemented using an interactive website via a user computer connected to the Internet. In this manner, a user can play with the virtual toy in a computer generated fantasy world (i.e., the virtual world).

Graphics, animation, sound, and even recorded images might be utilized to generate this virtual world. Even live images might be utilized, if desired. In addition, other sources of material can also be utilized. In essence, the virtual world creates an interactive playland for the toy owner to encourage imagination using the toy, and at the same time, provide an incentive to purchase additional toys or encourage additional individuals to also purchase toys in order to participate in the Entertainment System.

Throughout this disclosure, the term "virtual" is used, for example, to describe the user viewable/hearable material presented to the user on the user computer from data and/or computer programs and commands generated and/or provided by the Entertainment System, to the user computer running one or more computer applications (e.g., a web browser with the appropriate plug-ins, applets, and/or other support programs, etc.). The System provides the data and/or programs, via a communication network connected to the System and the user computer (e.g., the Internet).

The term "virtual" does not necessarily mean that the displayed item is not "real", because the displayed item could, for example, be a video or picture of a real item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user. Furthermore, the user is provided access to games and trivia as well.

In the current embodiment, the virtual world provides a biography of the toy, a virtual representation of the toy (the virtual toy) using graphics and/or sound (such as an animated image, for example) to participate in games and activities. The system also provides a virtual means for maintaining the "health and well-being" of the character through various maintenance activities, such as virtual feeding and playing, virtual shopping, and virtual medical check-ups, for example.

Furthermore, in the current embodiment, the Entertainment System can be utilized for marketing additional toys and/or accessories and/or services related to the toy to allow restricted access to additional online activities and features to those who purchase the toys.

The Entertainment System of the current embodiment may provide some general services and features open to the public, such as information about the toys and where to purchase them, a description of the features of the website, and other similar information. However, the primary purpose of the System in the current embodiment is to encourage the public to purchase a toy to obtain a registration code for access to the primary features and services. Accordingly, the primary features of the System are restricted to registered users. The existence of the System may encourage initial sales of the toy by new users (such as via word-of-mouth from current users), and the System will also encourage the purchase of additional toys by current users.

Online sales may be supported and encouraged in an alternate embodiment, but in the current embodiment the invention is intended to be utilized to sell toys in retail establishments. Thus, the invention becomes a marketing tool, utilizing word-of-mouth and the desire to increase participation in the virtual world, and thusly makes the toys more attractive to retail merchants and increases their sales.

In essence, the present invention in its current embodiment provides an Entertainment System including an online virtual world with a virtual toy representing a toy purchased at a retail store. The toys might be plush toy animals, for example. However, there is no limit to the type of toy that the system could support, as long as the toy can be represented by a virtual replica.

The current system functions basically as follows: A consumer purchases a toy (such as the plush toy animal representing a particular animal, for example, or some other toy). The toy includes a tag attached to the toy body or the toy packaging (or alternatively, another indicator and/or a storage device) indicating a web site address and a registration code. The user can load the System web site using the web address in a browser application running on the user's computer, and then enter the registration code to register the toy, thereby obtaining access to restricted portions of the System website.

In an alternative embodiment, the code can be automatically entered via the storage device, for example, for automatically loading, and/or downloading, and/or registering the user with the System.

Registration allows the user to participate in a virtual adoption process utilizing a virtual online replica of the toy (the "virtual toy") to provide an analogous online representation of the toy. The virtual toy should look somewhat like the real toy (e.g., same type of toy, similar shapes, color patterns, etc.), but could be more "cartoonized", for example, and can be animated, which may or may not be the case for the real toy.

The registered user can then participate in various activities both for enjoyment, and to virtually "maintain" the virtual toy in a happy, healthy, contented state.

The System of the current embodiment utilizes a server subsystem including a web server subsystem for generating both dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, java scripts, etc., to provide dynamic content to the user.

FIG. 1 shows a top-level block diagram of the Entertainment System 1, interacting with various users 10. The users 10 should have previously purchased and registered one or more toys from a Retail Merchant 9, who obtained the toys from a manufacturer 8, or via a distributor.

If the user has not yet purchased a toy, he can still access the System 10 to obtain information about the System and/or the toys, but will not, in the current embodiment, have access to much of the site until a toy is purchased and registered.

The Entertainment System 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem.

The Entertainment System 1 also comprises a Storage Subsystem 5, for storing system data, user IDs and passwords, toy registration codes, personalized user information, etc. utilized by the various subsystems. The Storage Subsystem 5 of the current system will utilize a commercially available database application running on commercially available hardware, for example.

A Registration Subsystem 6 is used for registering the user and the user's toy into the system, so that the user has access to restricted portions of the system. The Registration Subsystem 6 may utilize its own dedicated application and hardware, or could be combined with or share the Server Subsystem 2 applications and/or hardware. The registration subsystem examines the registration code against stored data relating to a plurality of registration codes each representing a toy for sale.

A Virtual World Providing Subsystem 7 generates and/or provides the virtual world data to be served by the server 3 to the users 10 for use in displaying a virtual world on the users computers. Portions of this data may be generated on the fly in response to user interactions, and portions are likely to be obtained and/or derived from data stored in the Storage Subsystem 5. (For example, in the current embodiment, items owned by the user (the items in the dock for example), the virtual room state [virtual furniture in the room for example], virtual cash, health, happiness, hunger parameters are all examples of "stored data", whereas data generated on the fly include position in the room [which also gets stored], and Arcade Game scores, all of which are described in more detail below).

Again, the Subsystem 7 may utilize unique applications and/or hardware, or may be combined with one or more of the Registration Subsystem 6 and/or the Server Subsystem 2 applications and hardware.

Figure 2:
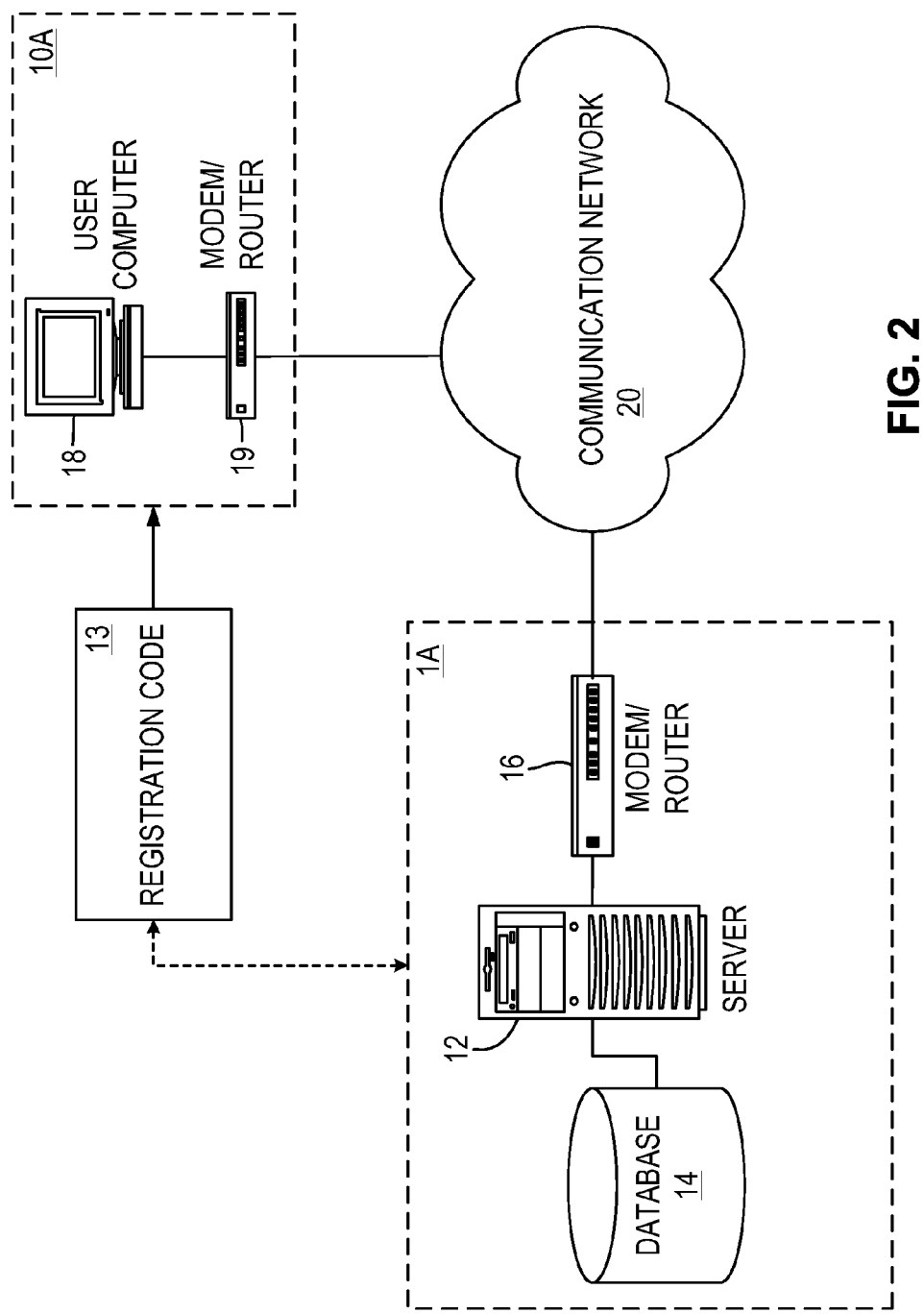
FIG. 2 shows a schematic diagram of a possible hardware implementation of an embodiment of the invention.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router and/or modem 19, for example. In this implementation, the server 12, along with the database 14 and router/modem 16 and the appropriate software, implement all of the subsystem functions of the System 1 shown in FIG. 1 by executing various application programs on the server 12 hardware, for example. Of course, the system 1A may also support many additional users in a manner similar to that shown for user 10A, for example.

The current embodiment can utilize the Internet as the public communications network. However, other communications networks could be utilized, such as telephone networks, cellular networks, dedicated networks, cable TV networks, power lines, etc. Furthermore, combinations of these networks can be used for various functions. However, because of the ubiquitous nature of the Internet, a solution utilizing that diverse network (which can utilize many individual communications networks) is utilized in the current embodiment.

Furthermore, the System 1 might also utilize a private communication network for at least part of the system. For example, the Registration Subsystem 6 of FIG. 1 might be connected to a private computer network located at the retail store 8, where the user might register the toy, for example, as discussed in more detail below. Alternatively, the toy might automatically be registered at the time of purchase (e.g., by scanning a code at the register, for example), and thus not require any user interaction at all beyond purchasing the toy. Or the user might send in a registration card to implement registration, as another example.

Figure 3:
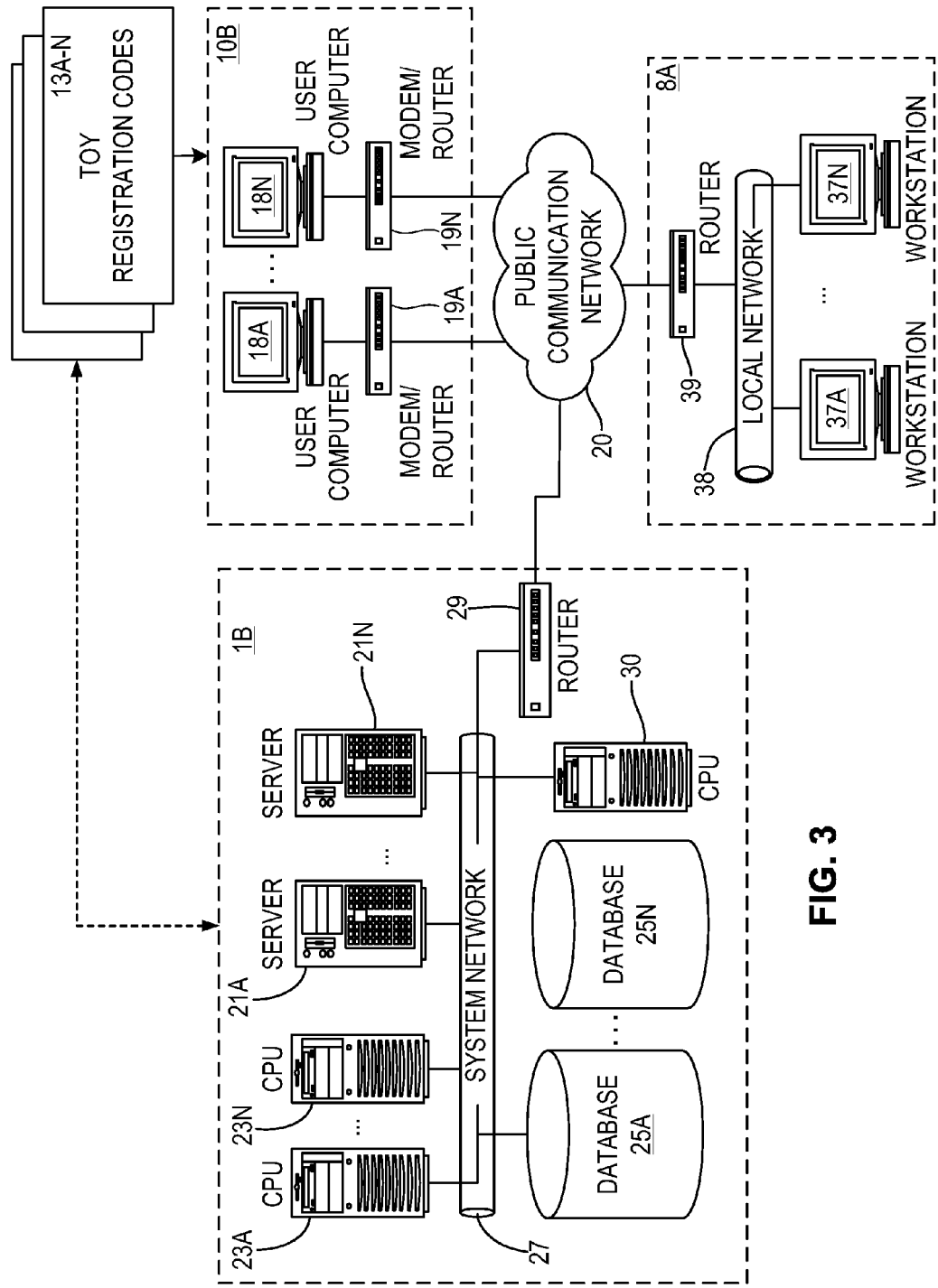
FIG. 3 shows a schematic diagram of a more complex hardware implementation of another embodiment of the invention.

FIG. 3 shows a more complex implementation 1B of the System 1. In this example system 1B, a plurality of servers 21A-21n can be utilized to implement the server subsystem 2 functions of FIG. 1. Furthermore, a plurality of CPUs 23A-23n can be utilized to implement the Virtual World Providing Subsystem 7 functions of FIG. 1. A plurality of database storage devices 25A-25n may be used to implement the Storage Subsystem 5 functions of FIG. 1. And a CPU 30 can be used to implement the Registration Subsystem 6 functions of FIG. 1, for example. Finally, a router 29 can be used to connect to the Public Communications Network 20

Note that, although FIG. 3 shows multiple servers 21A-n, multiple CPUs 23A-n, and multiple databases 25A-n, any of these might be implemented on one or more shared computers in various configurations, executing one or more computer program applications, as desired. As the number of users supported by the system 1C grows, additional hardware can be added to increase the capacity of the system, as necessary, in a manner similar to that shown in the Figure.

Continuing with FIG. 3 showing the more complex implementation 1B, a plurality of users can be supported in various configurations. For example, a plurality of users 10B operating single workstations 18A-18n, individually connected to the public communications network 35, can be supported. Furthermore, complex user networks can also be supported. Retailers and or Toy Manufacturers might also have access to the system, as represented by the example shown in 8A, should an online-ordering system be implemented for selling toys. Of course, alternate implementations are also possible, depending on the types and number of users and/or retailers being supported, and also depending on the state-of-the-art computer technology.

In the current embodiment, the System uses an Apache web server running in a Linux environment. For webserver hardware, an Intel 2 Ghz+CPUs with 2 GB RAM running Gentoo linux with the appropriate extensions (e.g., mod_php4 and mod_perl) can be utilized. The server will serve flash content to a web browser running a web browser application using PHP, Perl, and actionscript, and flash plugins. A MySQL database application will also be utilized for the storage subsystem.

The client (user) side Flash application make the calls to a number of PHP files. These PHP files then "interface" with the MySQL database to obtain the necessary data. All are served by the Apache web server, which can serve HTML, XML, along with the appropriate flash and other content. For multi-user environments (e.g., the multi user rooms discussed below) these are served by a socket server written in Perl.

Figure 1A:
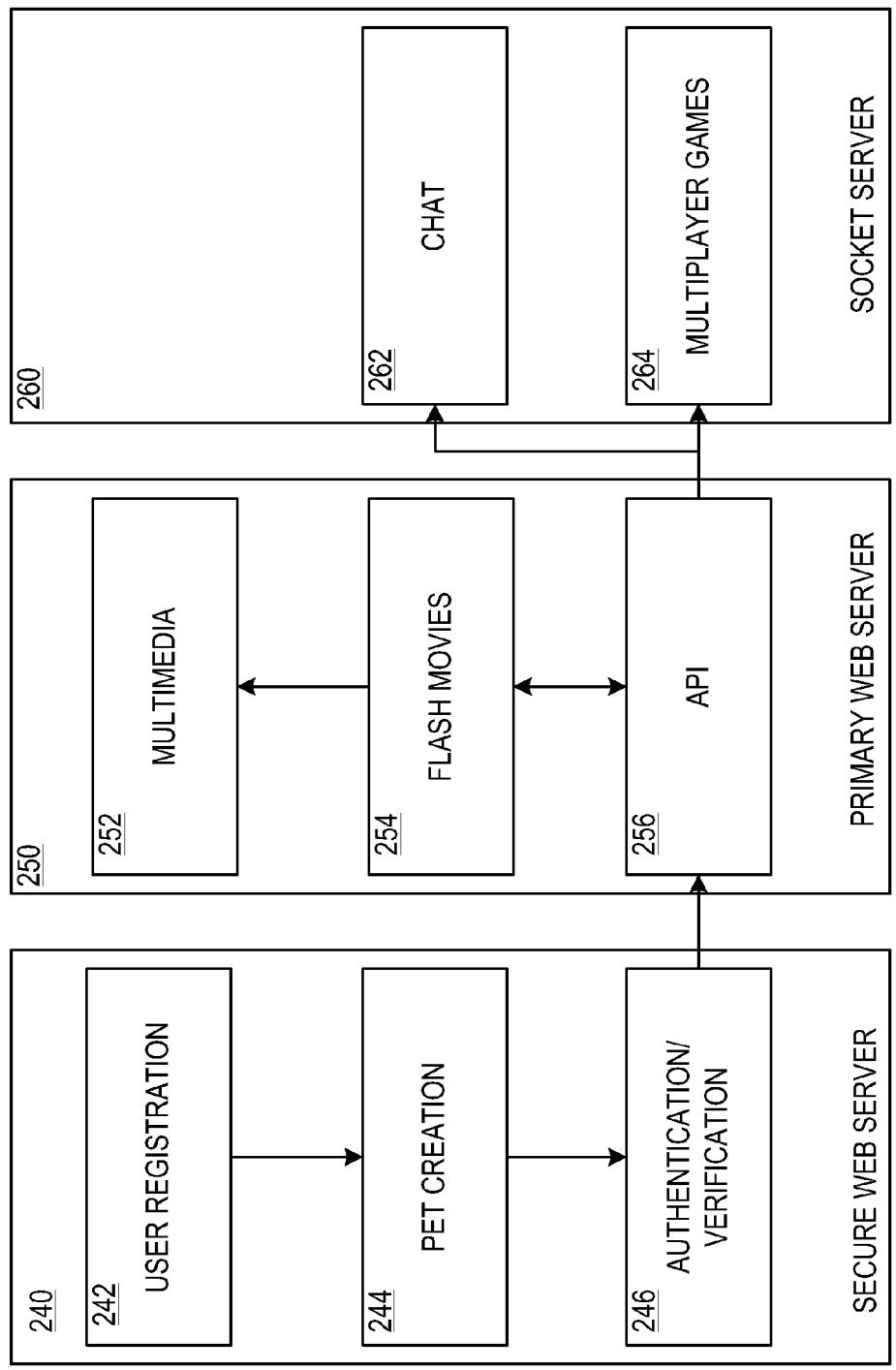
FIGS. 1A, 1B and 1C show additional implementation details about the embodiment of 1A.
Figure 1B:
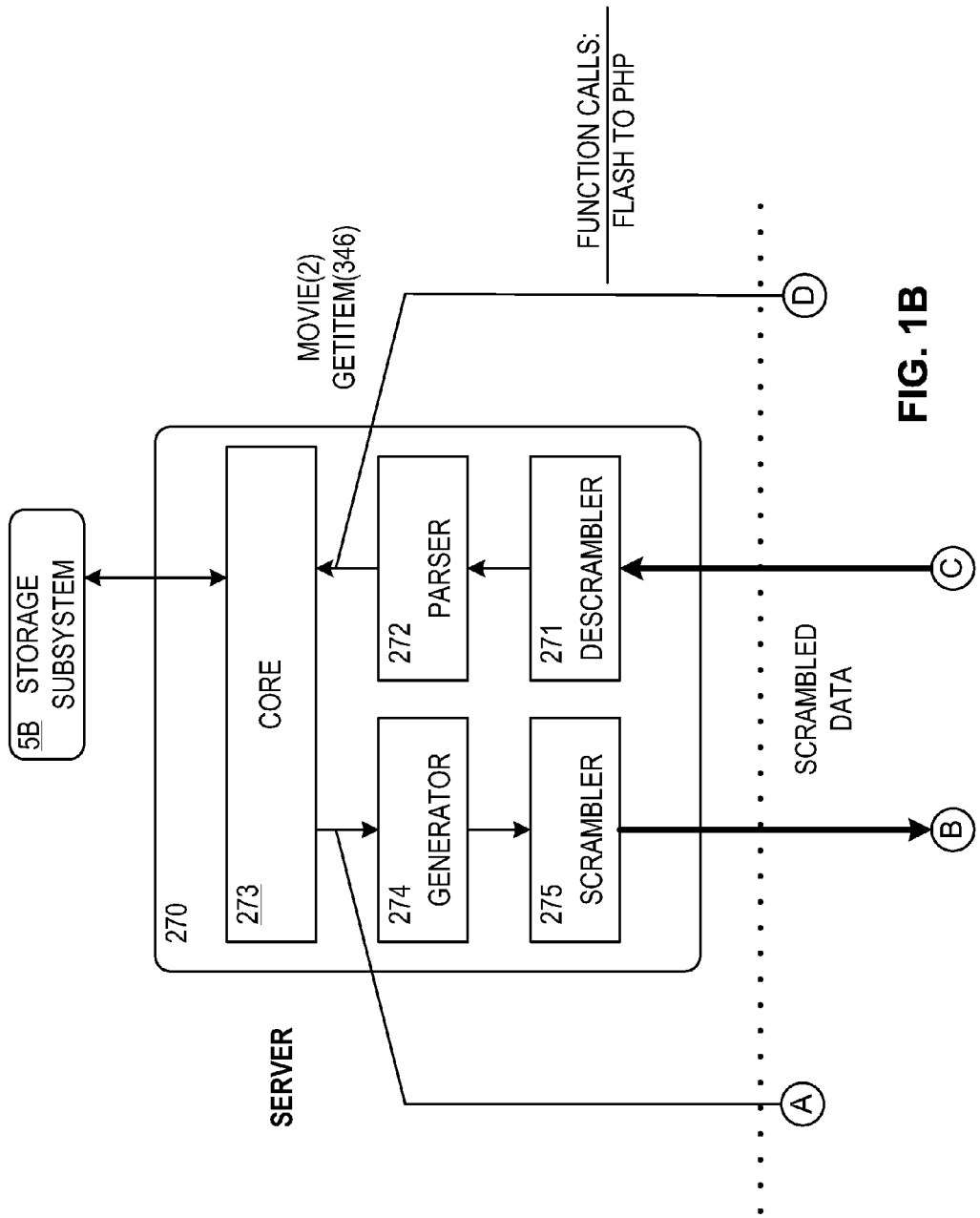
Figure 1C:
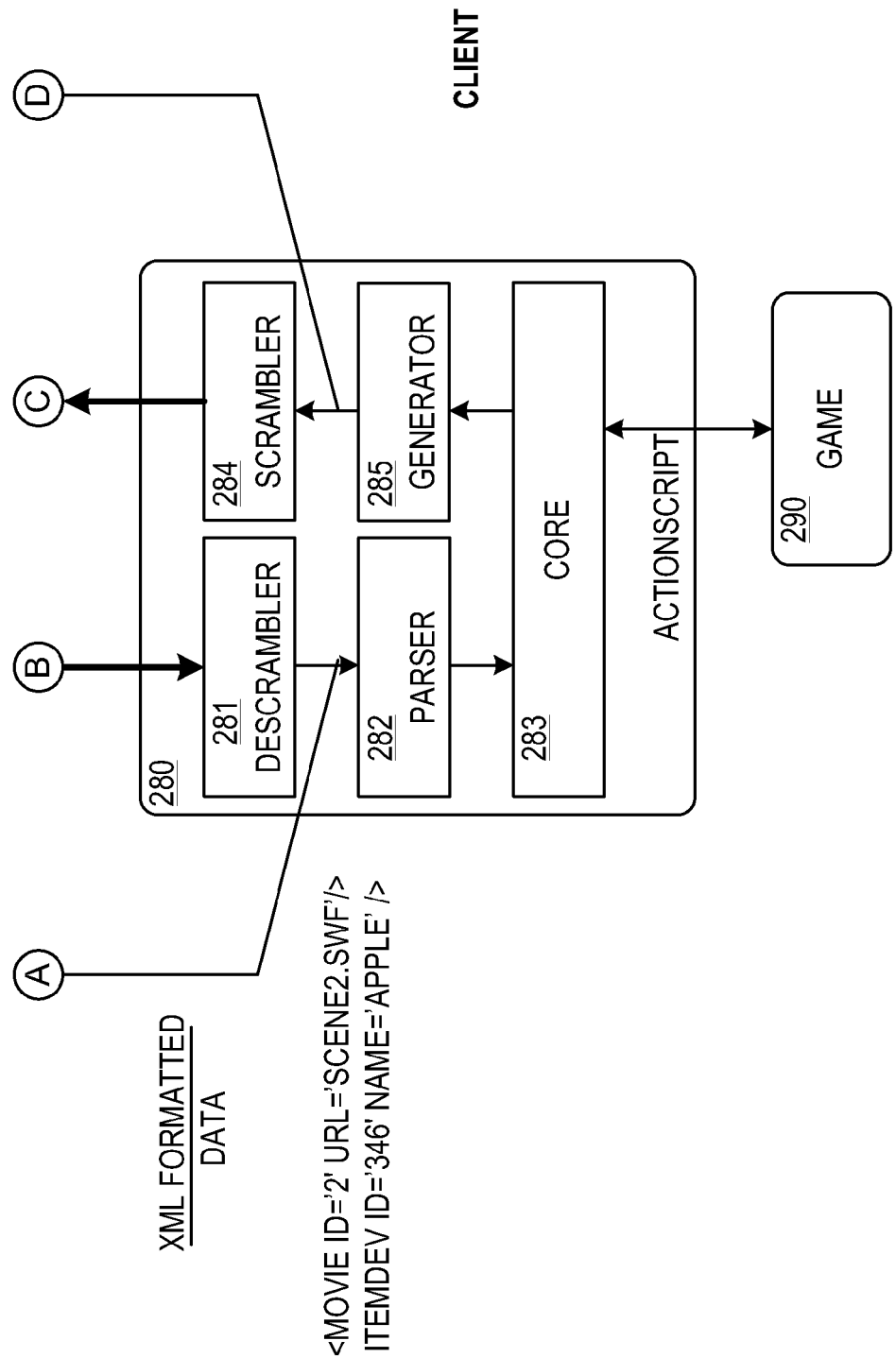

This is effectively a 3 layer type of setup: Flash layer <--> PHP layer (this handles requests to the back end)<--> MySQL database, as shown in FIG. 1A. FIGS. 1B and 1C show the interaction between the client (user) and server subsystem data flows in more detail. A dedicated database server running MySQL on a dedicated computer running the Gentoo linux OS can be used in the current system.

A secure Apache SSL server can be utilized for the registration subsystem, likely sharing the computer with the other Apache server.

FIG. 1A shows an implementation of the current system utilizing an Apache Secure Web server 240 for serving files over secure connection (HTTPS, SSL mode), and an Apache Web server 250 for serving files over regular HTTP. A custom Socket Server 260, which is an XML socket server, written in PERL, is also utilized for providing independent environments for game sessions.

Items 242, 244, and 246 are parts of adoption center (discussed below), which is a flash application with PHP backend. Item 242 provides for user registration, using a form-driven flash application which validates the registration code and creates a user account within the system. A pet creation application 244, is a form driven flash application designed for guiding the user through pet creation process, and validating the registration code.

Authentication/Login process 246 is a flash application validating user credentials on the server side and spawning an API core in case of validation. It also has module designed for password retrieval based on collected user information, and currently passes user data to a client side API, and may in the future pass user data and a generated encryption key for a current session to a client side API.

Items 252 & 254 are Different media (files) available on the server subsystem for user use. Item 254 represents Flash Movies and Games available for the user. Item 256 represents the server side API. Chat 262 and Multi-user games interactions API (MAPI) 264 are a part of Client side API and are used for setting up and maintaining connection to the socket server, authenticating the user, and work in a pass-through mode for multi-user games/environment to exchange messages.

FIGS. 1B and 1C show the API as a functional layer, serving end user applications (Flash games and such) with stored data (users statistics, virtual toys' properties, item parameters, etc.) retrieved from the database; it also is used to modify/enter certain data.

The scheme of the API is subdivided into Client part 280 (flash application) and Server part 270 (PHP script). Flash clip/movie Game 290 calls a function within the API client side [Core 283] passing a request to some arbitrary data. The Client side API [Generator 285] sends the request to [Parser 272] server side API. The Server side [Core 273] processes it and retrieves data from the database, wraps it in XML [Generator 274] and sends it back to the Client Side API [Parser 282], which calls specified a callback function within originator Flash clip/movie [Game 290] and passes received data to it.

To ensure users privacy, prevent cheating and preserve validity/authenticity of information, additional security layers can be designed which encrypts all data being passed back and forth in-between parts of the APIs (client/server).

The chosen Encryption technique of the current embodiment is a modification of TEA routines, using a Feistel cypher with 128 bit key. Keys are generated at the login stage and securely passed to client side via HTTPS, after which the adoption centre spawns the client side API and passes the encryption data specific for the session. Additional measures which can be taken to prevent cheating and maintain data coherency include using different permutations of the original key for every data transmission.

The software of the Computer Program Listing Appendix supports the above described current configuration of the system.

Figure 4:
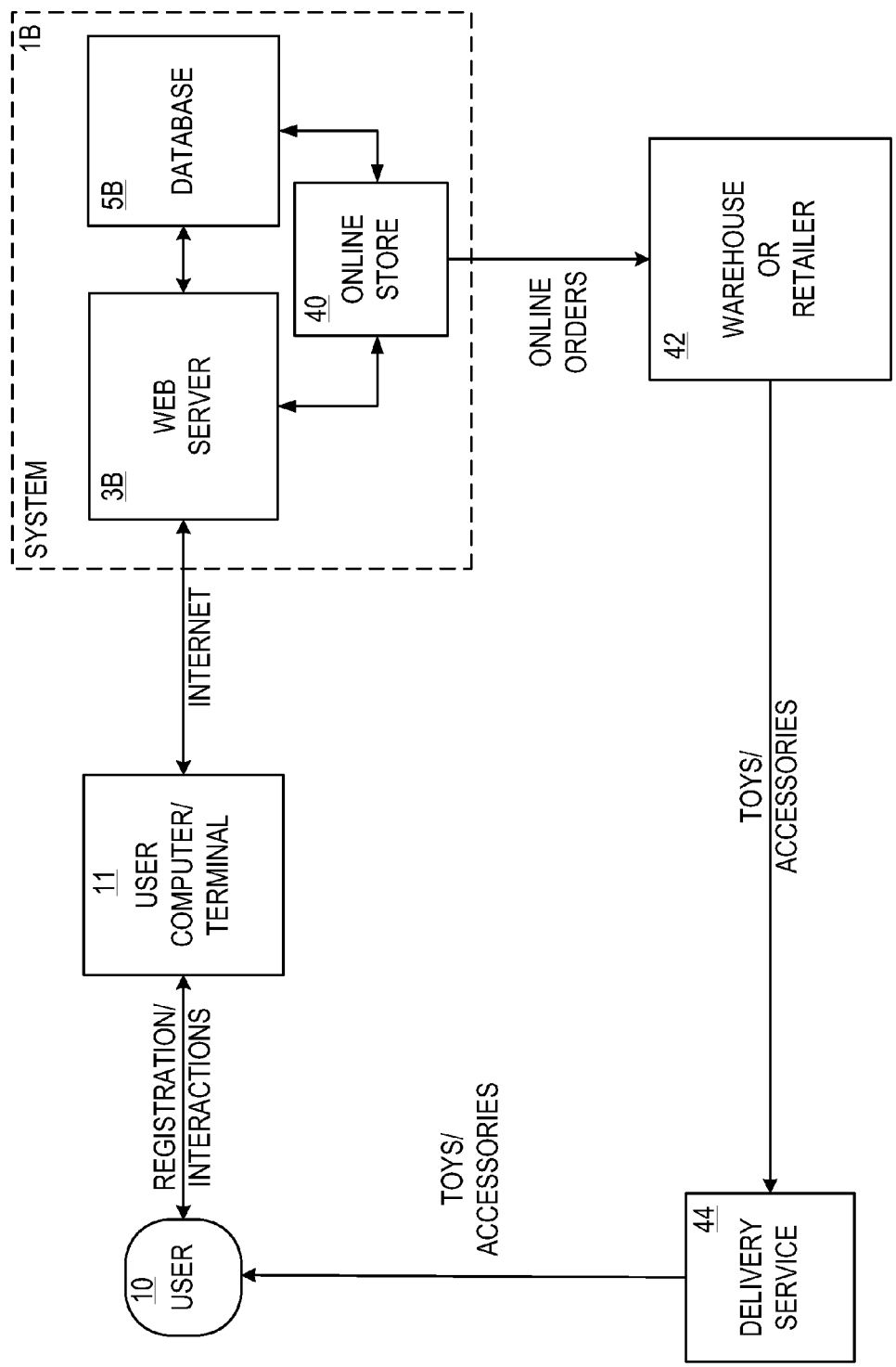
FIG. 4 shows a block diagram of another embodiment of the system and its interactions with some external entities.

FIG. 4 shows an alternate embodiment of the Entertainment System where the toys are sold to user via an online merchant. In this alternate embodiment, the Entertainment System 1B includes an online store 40 for a user 10 to purchase toys. The user 10 purchases the toys using the user computer 11, making an online payment using a credit card or online payment service, for example. A Warehouse or Retailer 42 then delivers the purchased toys, via a delivery service 44, for example, to the user 10. Registration of the toys could be automated, or as described above and below for a store-purchased toy.

Figure 5:
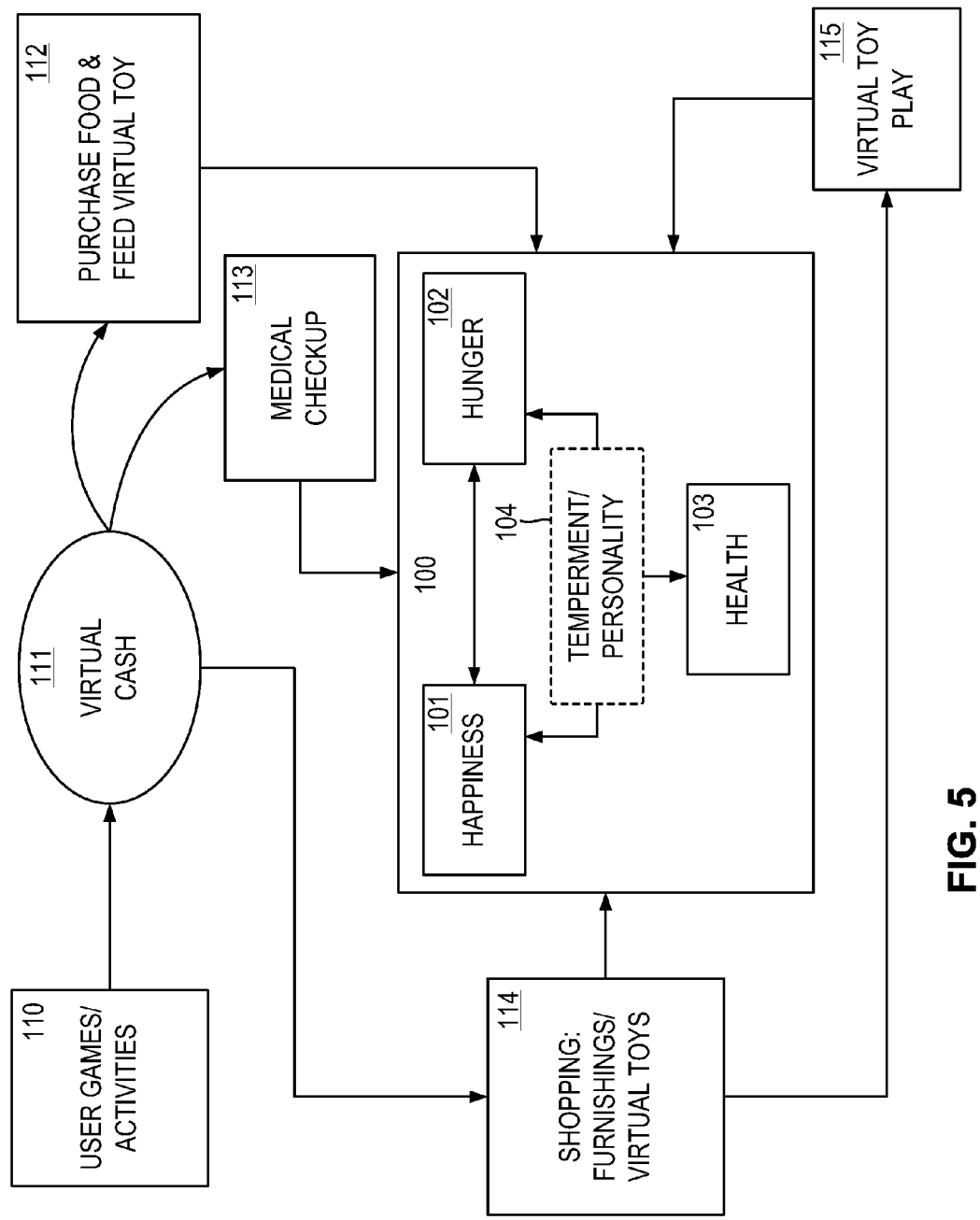
FIG. 5 shows a diagrammatic representation of some features of a virtual world according to the current embodiment.

FIG. 5 shows a diagrammatic representation of some features of the virtual world. An interesting feature of the current embodiment is maintaining the virtual well-being of the virtual toy. The well-being parameters 100 include Happiness 101, Hunger 102, and Health 103. In the current embodiment, numerical values for each of these parameters are tracked and displayed to the user, as described in more detail below.

Furthermore, each virtual toy can have a specific Temperament/Personality 104 which impacts how the Happiness 101, Hunger 102, and Health 103 parameters interact with each other, and with activities in the virtual world, and how quickly they change. For example, a virtual toy representing a toy sheep might be more easily be made happy, and have less of an appetite, than a virtual toy representing a toy lion, which may be more grumpy and have a greater appetite, for example. Thus, the virtual toy sheep may be easier to please and need less food than the virtual toy lion, for example. Alternative parameters could also be utilized. For example, a robot toy might have a "charge" or "energy" level, and an automobile might have a "fuel" parameter, rather than a hunger parameter, for example.

One of the features of the Entertainment System in the current embodiment is to provide online User Games and Activities 110, which can be used to win more virtual cash 111. Some of these Games/Activities 110 are described in more detail below.

The collection of virtual cash 111 is for use in making "virtual purchases" of various "virtual commodities", for example. In the current embodiment, each registration of additional new toys adds an increasing amount of virtual cash, which is monitored and tracked by the System, the balance of which is shown to the user when the user is participating in the virtual world. Virtual cash can be earned by playing games, successfully answering trivia questions, and via other means as well.

Furthermore, Virtual Cash 111 can be used to shop for virtual furnishings and accessories 114. These can be used to furnish one or more virtual rooms set up for the virtual toy. Furthermore, by furnishing the virtual room(s) and adding virtual accessories, the well-being parameters 100 of the virtual toy can be improved by the System, especially the happiness parameter 101 and the health parameter 103. Thus, a user can improve these parameters by using virtual cash to accessorize and outfit the various virtual rooms.

Furthermore, in the current embodiment, the user can purchase virtual Food and virtually feed the virtual toy 112, in order to satisfy the virtual toy's hunger parameter 102. This will also improve the virtual toy's happiness 102 and health 103 parameters in a manner determined by the System (utilizing, for example, the temperament/personality 104 of the toy).

Finally, in the current embodiment, by playing 115 with the virtual toy, the virtual toy's happiness and health parameters are improved. Playing may, however, make the toy hungry, thus affecting the toy's hunger parameter 102. The virtual cash virtual cash may also be used to provide a virtual medical checkup for the virtual toy to improve the virtual toy's health parameter 103.

In this manner, the Entertainment System uses the well-being parameters and virtual cash to help balance a platform for providing fun and activities, with an incentive to purchase new additional toys, and to increase the user's attachment to the physical toy. The fun and enjoyment obtained through the use of the system provides free word-of-mouth advertising, which also helps sell additional physical toys. In this manner, the Entertainment System is a marketing tool that will increase the overall sales of the toys, and thus provide a benefit to retailers selling the toys.

Figure 6:
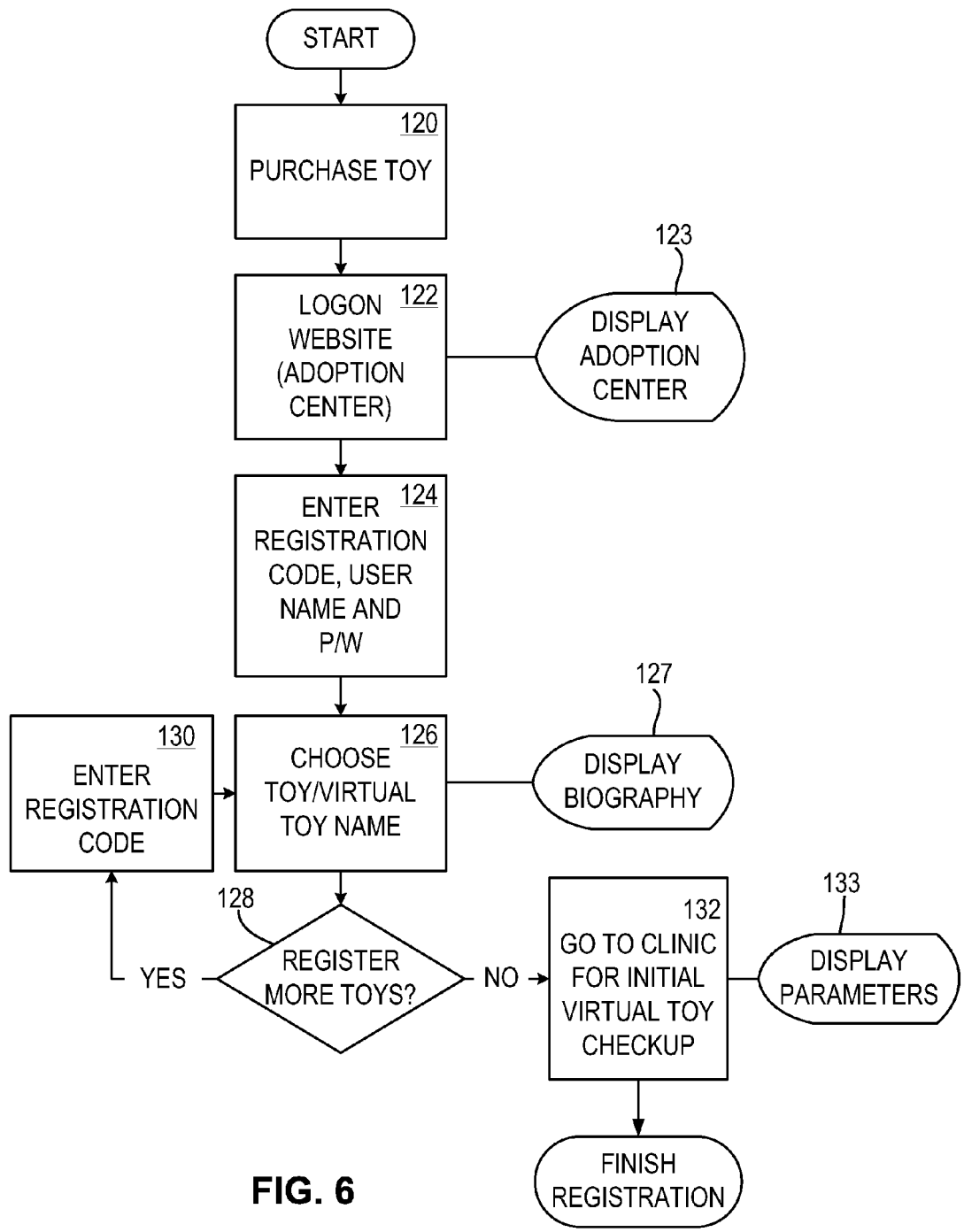
FIG. 6 shows a manner of a user registering with the System of the current embodiment for utilizing the System features.

FIG. 6 shows the preferred manner of a user registering with the System for utilizing the Entertainment System. The user typically makes his first purchase 120 from a retail store. However, in an alternate embodiment, online purchases might also be supported using an online store (as discussed above for FIG. 4), especially for subsequent purchases.

Figure 9:
FIG. 9 shows a sketch of an example toy according to the current embodiment.

The toys might be, for example, plush toy animals, robots, action figures, figures based on cartoon characters, vehicles, aliens, inanimate objects, etc. FIG. 9 shows an example sketch of a plush toy horse that might be purchased at a retail store and used for the Entertainment System.

Figure 10A:
FIGS. 10A and 10B show the front and back of a tag listing the System website address and a registration code according to the current embodiment.
Figure 10B:
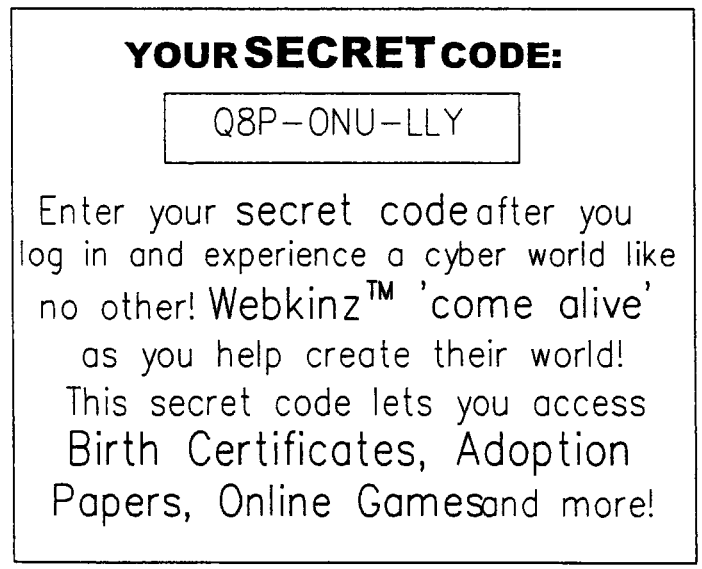

The toy will be paired with a hang tag or other device having the system website address and a registration code imprinted thereon or stored therein. For example, in the current embodiment, a simple paper or cardboard hang tag, as shown in FIGS. 10A (front) and 10B (back), has the website (FIG. 10A) and the registration code (FIG. 10B) imprinted on the tag.

Alternatively, an electronic storage device, such as a USB key, or wireless RF tag or Bluetooth device, could be embedded within or provided with the toy and/or its packaging at purchase. The electronic device would then have the registration code stored in the device using electronic memory (RAM, ROM, EEPROM, etc.), for example. As electronic storage devices become cheaper, using such a device for storing the registration code may become the preferred approach.

Figure 11A:
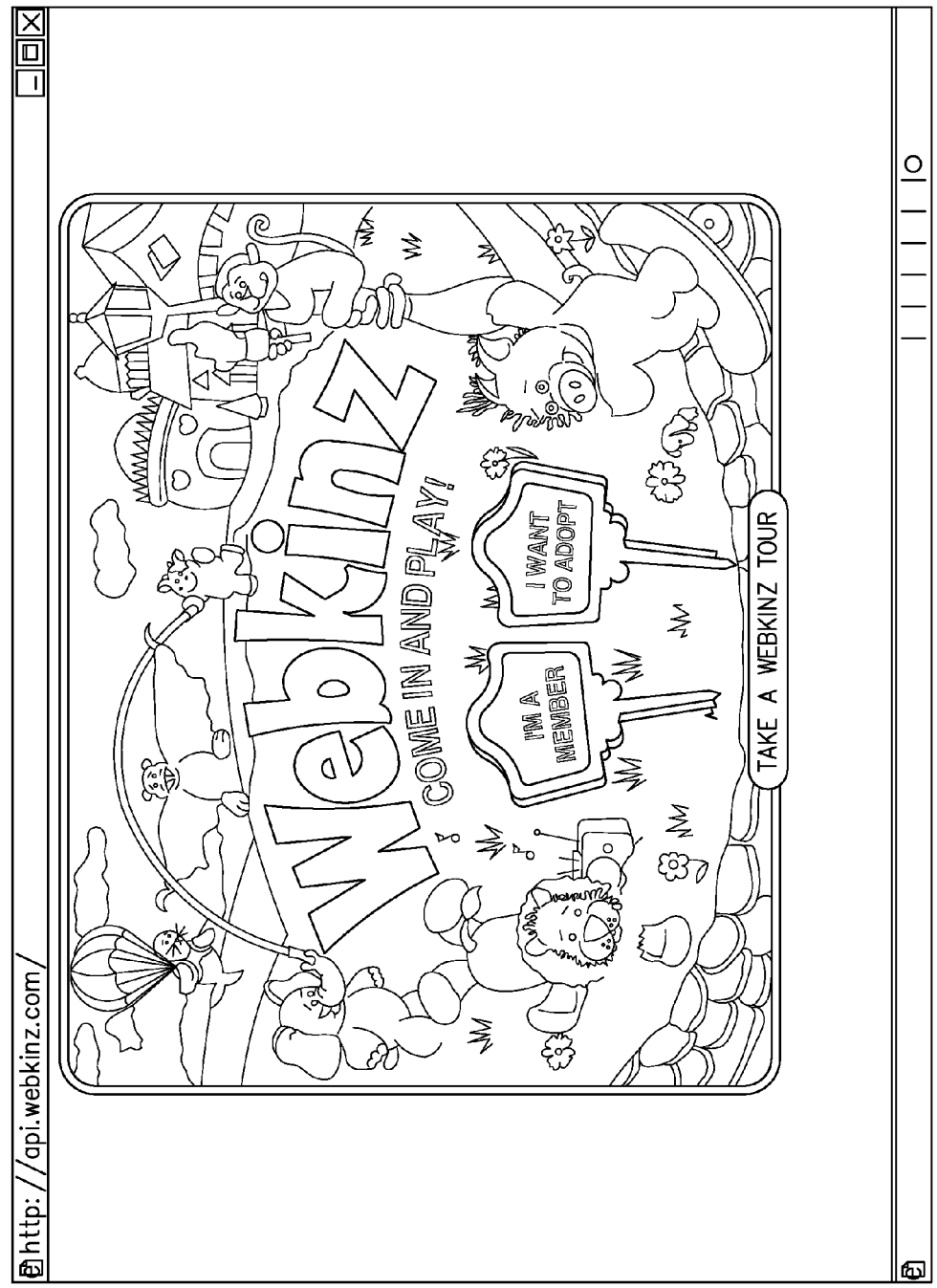
Figure 11B:
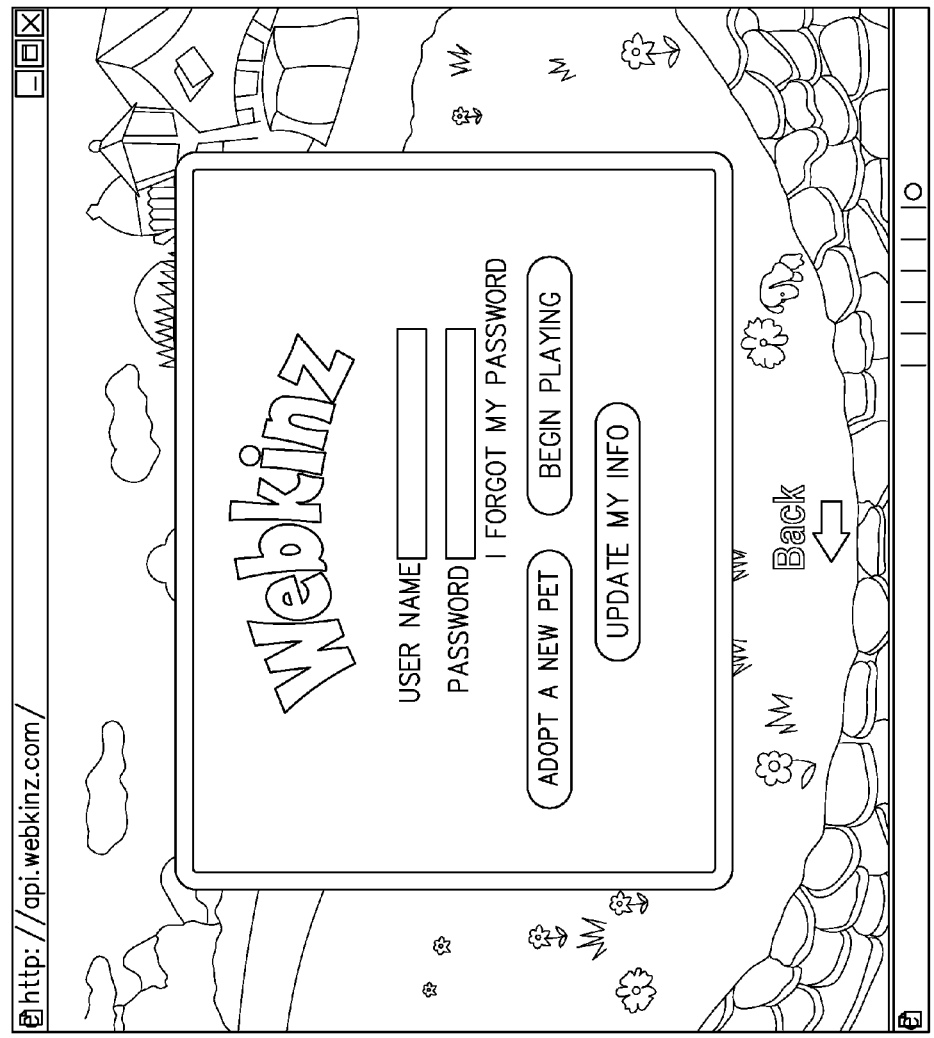
Figure 11D:
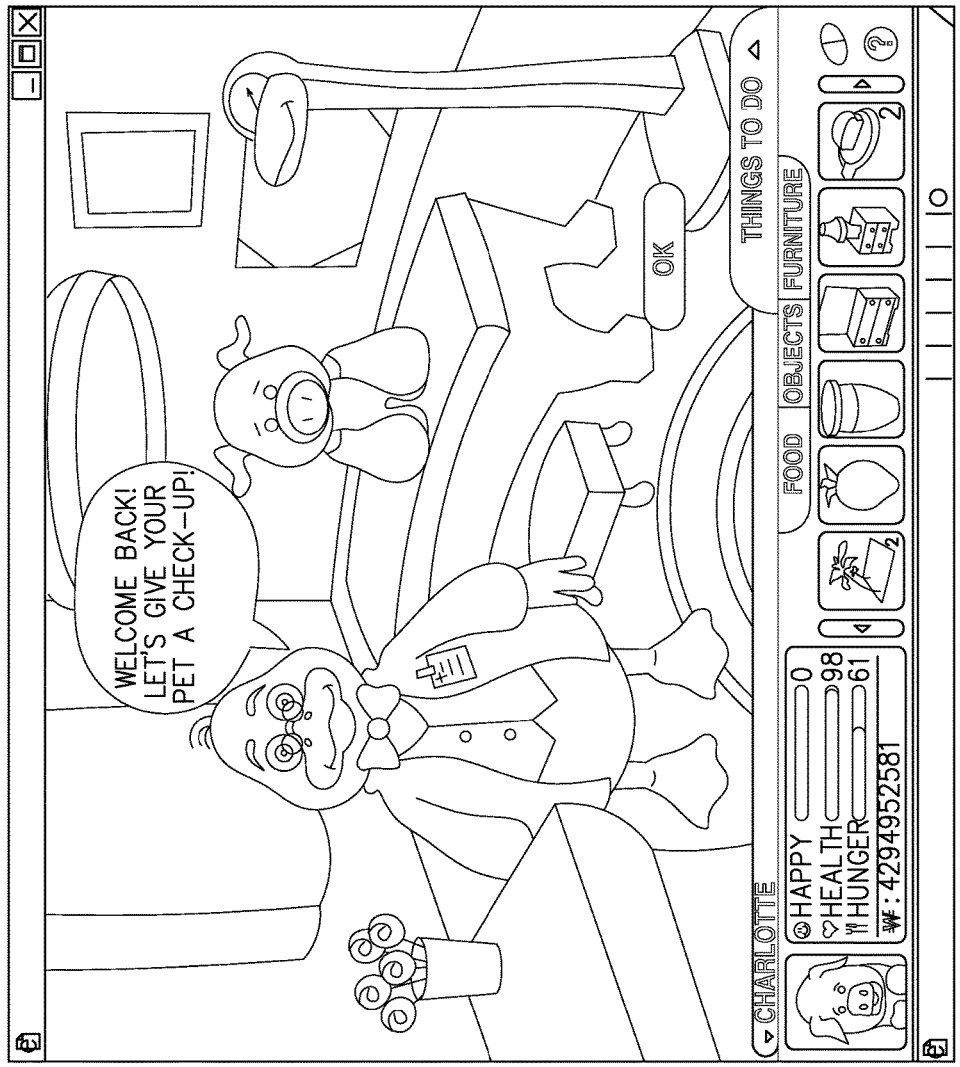
Figure 11E:
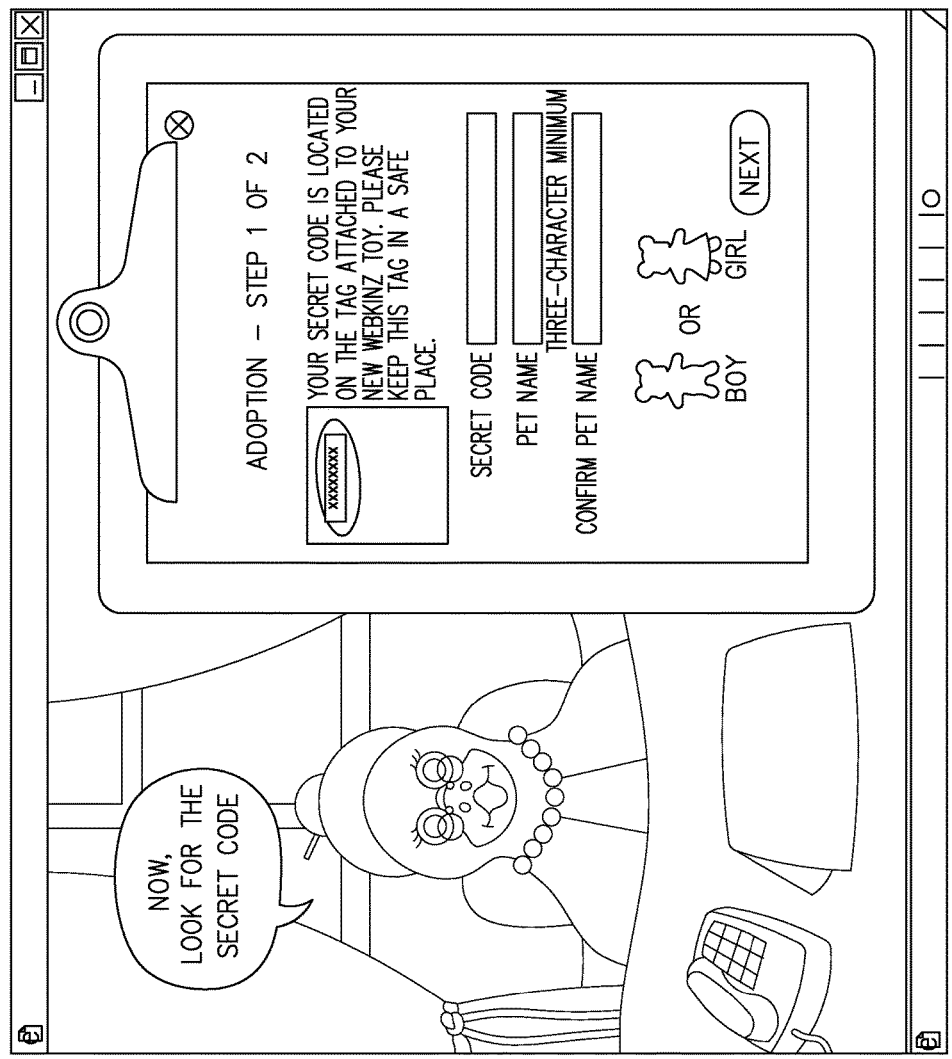

For the current embodiment, after the user takes the toy home, the user begins the registration process by visiting the Entertainment System website using the address on the tag and a user computer via an Internet connection to load the home page (see screen shot FIG. 11A) and logging on to the System website (see screen shot FIG. 11B) to load the adoption center 122. The System then displays an adoption center page (item 123 of FIG. 6), and example of which is shown in screen shot FIG. 11E.

In the current embodiment, the user then registers the toy, thus receiving access to the various online features of the invention, as discussed herein.

The registration process 124 of the current embodiment is performed by manually entering the registration code printed on the registration tag via the user computer connected to the Internet. The user also chooses a user ID and password. The System can ensure that at least the combination of ID and password is unique, or might also insure that each user ID is unique as well.

Personal information might also be requested in order to recover user ID and password information. Such personal information might be a favorite color, user's birthdate, etc.

In an alternative embodiment using an electronic storage device with the registration code stored therein, the electronic device will communication with the user computer via a corresponding device, and thus automatically or manually transfer the registration code to the user computer. For example, the System could request that the user plug in a USB key into the user computer at the appropriate time, or the user computer may wirelessly read an RF or Bluetooth device located in or on the toy.

In the current embodiment, after the user enters the registration code, and before or after the user enters the user ID and password, the System checks the registration code in any one of a number of ways. In essence, the system uses stored data relating to all of the registration codes associated with corresponding toys for sale.

The system might check the registration code against a list of valid registration codes stored in the system database, for example. In this case, the stored data are the actual registration codes themselves. If there is a match, the registration code has been validated, and the system then determines the type of toy that the user purchased based on information stored with the registration code in the database. For example, each code could be linked to information about the type of toy (e.g., a basset hound, a fish, a lion, a robot, a soldier, etc.), its coloration and appearance, its temperament, etc.

The System may display a user agreement at some point, providing the terms of usage and legal notices, for example. The System require an affirmative response from the user in order to complete registration.

In such an embodiment discussed above, it would be beneficial to make each registration code unique and complicated, in order to make it difficult for an imposter or unauthorized user to make up a code or use a previously registered number to obtain unauthorized access or unauthorized additional virtual toys.

As an alternative, after being entered, the registration code is used in a mathematical algorithm to determine its authenticity, and such an algorithm might also be used to determine the type of toy being registered. For example, all lion plush toy registration codes might start with the letter "L", and might use a following number that can be factored into exactly 5 prime numbers, for example, or the number might fall into a particular range or format. Another example is the use of an algorithmic pass-code based on a central key value. In these examples, the stored data relating to the registration codes provides the proper information to perform the validation process (e.g., the proper letters, number ranges, acceptable factors, the central key, or the algorithm itself). Accordingly, by these methods, the actual registration numbers need not be stored, but could still be verified. Then, perhaps by storing the registered registration code, uniqueness could be guaranteed by never allowing that same code to be used again.

Of course, additional techniques can be used to determine a registration code authenticity as well, as long as the registration process ensures that it is likely the user has purchased a valid toy, and thus is an appropriate user of the system.

Referring again to FIG. 6, after validation and registration has occurred, and the user name and password accepted, the user is prompted to provide a name for the virtual toy 126 (or in an alternative embodiment, one is suggested by the site). The system can then display a biography of the virtual toy 127, and can also show the user what the appearance of the virtual toy will be. The biography may show such items as a virtual birth certificate, adoption certificate and/or information, likes and dislikes and favorite foods of the virtual toy, etc. The biography may be related to the personality/temperament of the virtual toy, the type of toy, etc. A virtual identity for the toy is thus created by the System, including the biographical information, the name provided by the user, etc.

The user might then be prompted to register any additional toys (128 & 130), if any. Finally, the System might provide the user with an initial virtual medical checkup 132 for the new virtual toy at a virtual clinic (see screen shot FIG. 11D for an example view of the clinic). The toy's wellness parameters can then be displayed to the user for the first time, and the registration process is thereby finished, and the user now has access to at least some of the restricted portions of the Entertainment System website.

Note that alternative means of registering the toy are also possible in alternative embodiments. For example, the user might phone in the registration code using a telephone, and be given a user ID and password, or choose one over the phone. Or the user may register the toy at the place of purchase using a dedicated or general purpose computer on a private network. Or, if the toy is purchased online, the registration might occur at the time of purchase, before the user has obtained the actual physical toy. Thus, different communication networks may be utilized for registration as are utilized for website access, for example.

The System website can present various interactive scenes into which the virtual toy is incorporated. In the current embodiment, the toy characters can be animals that reside in a virtual village, for example. New features can be opened based on the number of toy animals a user owns and registers. For example, there might be a special adventure that opens when the user purchases and registers his fifth toy, regardless of what those toys are.

In an alternative embodiment, the scenes might be customized based on the type of toy. For example, a basset hound plush animal could be shown in an urban landscape or setting. Likewise, a cow could be shown in the countryside, a monkey in the jungle, and a lobster under the sea, as additional examples.

Furthermore, in another embodiment, each type of toy might have different traits that can impact the way the toy reacts based on the type of toy. Thus, a toy lion might be a mean carnivore, while a toy monkey eats fruit and is playful, for example. Soldiers might be aggressive, while dancers are graceful, for example. Thus, any of the above concepts are not limited to animal toys, but could easily support other toys such as human dolls, robots, machines, soldiers, etc.

Having virtually adopted their toy by registering it with the System, the consumer can then participate in a variety of online games, some involving the virtual representation of the toy (i.e., the virtual toy). These games can include adventure games, trivia games, arcade-style games, and the like. Participants can collect "virtual cash", which is virtual money which can be spent to purchase virtual items for their toys, as discussed above and below. This virtual cash may or may not be useable at other sites, and may or may not represent legal tender.

Furthermore, a participant may purchase additional toys, register them, adopt them, and thus add them their virtual world, creating additional virtual toys. These purchases are preferred to be actual toy purchases using legal tender where the user obtains a real toy. However, in an alternative embodiment, "virtual toys" represented only online might also be utilized, whether purchased with legal tender or merely online "money".

Each of the new toys is, after registration, represented as a virtual toy which can interact with other virtual toys (including those created to represent other actual toys), including team game play, for example. Participants can also chat with other registered users using online chatting or posting features. The current embodiment utilizes a symbol chat with preset icons, rather than general text chat, to protect children from inappropriate language. However, generalized chatting features could also be added, such as provided by a commercially available chat program, for example.

Figure 7:
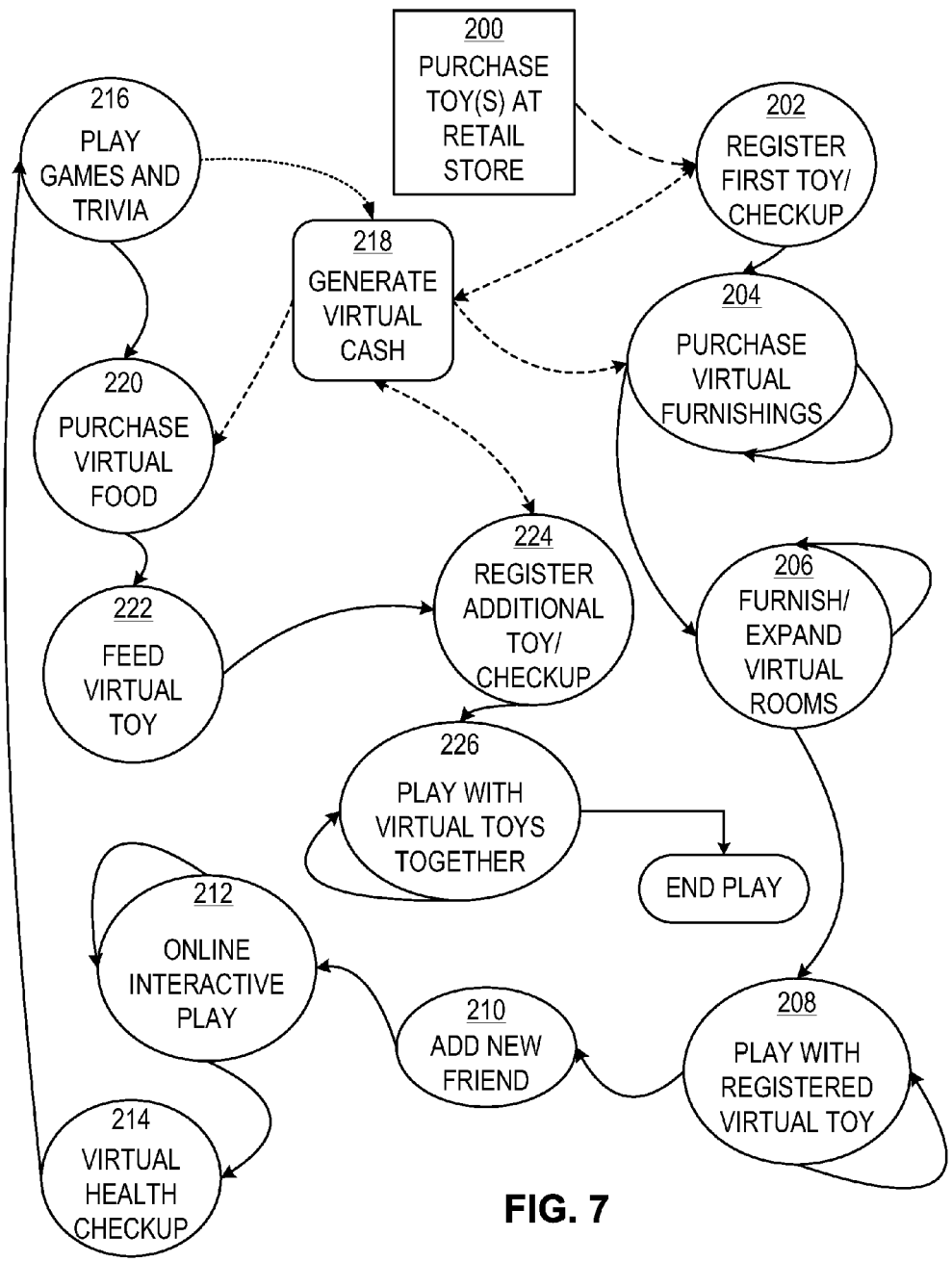
FIG. 7 shows an example of how a user might utilize the System of the current embodiment.

FIG. 7 shows an example of how a user might utilize the Entertainment System for a session or two. First, the user purchases one or more toys 200. Then, the user registers one of the toys 202, as described above. The user then purchases virtual furnishings and virtual accessories 204 for the virtual toy, and uses the purchased items to furnish the toy's virtual rooms 206. The user can virtually move the furnishings around the room by "point, click, & drag" operations, for example, thus testing various types of decorating schemes. The user can also paint/wallpaper the room, provide flooring, etc. all of which were purchased 204.

The user might then play with the virtual toy 208 for a while, increasing the toy's health and happiness parameters. The user might then add a friend to the site, and interactively play 212 with the friend, who can be online using his own computer. The friend will have virtual toy's that can be seen and interacted with, even though the friend may be remotely located, and thus not seen by the user. The user and his friend may chat with each other using the chat icons, for example.

The user might want to perform a checkup 214 of his virtual toy, if the toy displays some low health parameters. The user might then play various online games 216, including online arcades and trivia, in order to generate more virtual cash 218. The user might then use the new virtual cash to purchase virtual food, and then virtually feed 222 the virtual toy.

If the user bought additional toys, he can register the additional toys 224, which will also generate additional virtual cash 218. The user can then use both the original virtual toy and the additional virtual toy to play together, increasing the happiness parameter of both virtual toys, and perhaps making the toys hungry. The user then might end his online activities, or continue with additional online activities in a similar manner.

Figure 8:
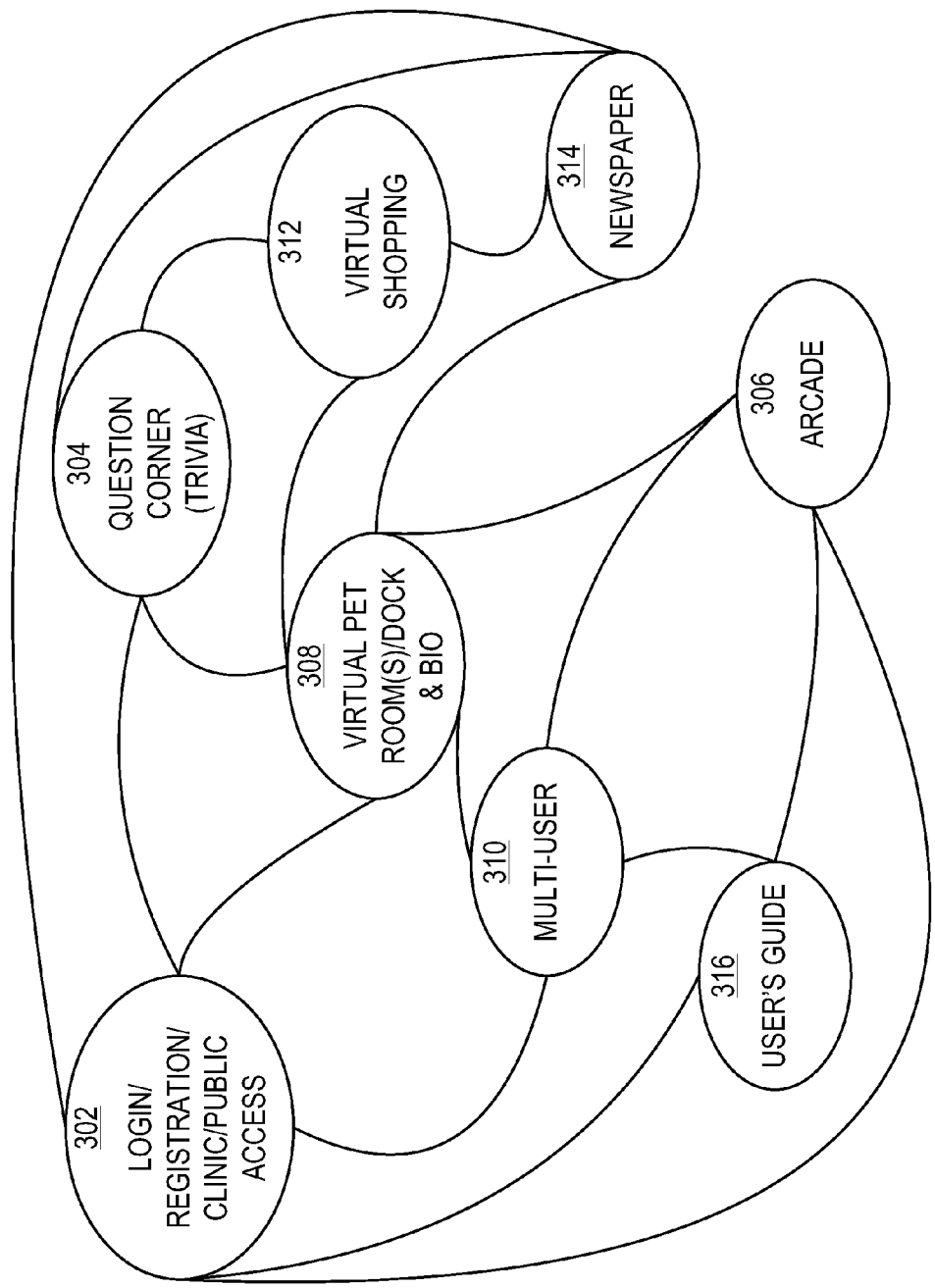
FIG. 8 shows a high-level map of the major features of the current embodiment.

Of course, actual user sessions can involve an infinite combination of the various features of the invention, and the process of FIG. 7 is merely an example. FIG. 8 shows a site mapping of the various features that are available in almost any order the user should desire. FIGS. 8A-8G show these features in more detail.

In the current embodiment, the virtual items in the virtual world can be made to interact with each other. For example, the virtual toy might sit in virtual chair, or climb on top of a virtual table. The virtual toy might walk around the virtual world, and play with its own virtual toys. Virtual toys may play and interact with each other. Virtual accessories might be placed on a table, and virtual pictures "hanged" on a virtual wall. Virtual chairs might be moved around, and slid up to a virtual table. The virtual toy might sit in a chair. Virtual food might be placed on a virtual plate, for example, and the virtual toy may simulate eating the virtual food. Thus the user is provided with an animated display of these interactions, including both video and/or audio components. In this manner, the virtual world simulates activity in the real world.

The user can also zoom in and out of various views, virtually move from room to room (i.e., display different rooms), etc. all by manipulating the mouse and keyboard of the user computer.

The virtual world and the games represented on the Entertainment System website may be changed and updated on a regular basis to maintain the interest of the user participants. For example, trivia game questions may be updated, and new games periodically added.

Further, new types of plush toy animals can be periodically introduced to encourage consumers to make additional purchases. Special or limited addition toys could be introduced, for example, on holidays. For example, an American bald eagle might be introduced to commemorate Independence Day, and a Santa Claus for Christmas. These new toys can be introduced to the user in a virtual manner, and the user encouraged to purchase the actual toy. Bonuses of virtual cash, or special activities might be provided to those who do purchase special toys.

Subsequent purchases of toys, when registered, may lead to increasingly greater deposits of virtual cash as a reward. For example, the first toy registration may lead to $1500 in virtual cash, a second purchase and registration may add $2000, and a third add $2500, for example. Furthermore, purchasing and registering a certain number of toys could lead to bonuses, such as additional virtual rooms, and/or access to additional games (e.g., an outdoor tennis court with game). These bonuses encourage subsequent purchases, and keep the user interested in both the System and the toys.

Additional features that can be included in additional embodiments, as discussed above, are incorporating a storage medium into the plush toy animal instead of, or as a complement to, the registration tags, for example. This might allow the online profile of the toy, including everything the toy has "learned", to be stored in the device with the toy. The toy could then be connected to another computer at another location, for example at a friend's house, in order to participate in online activities, as long as that computer is connected to the Internet, for example. Furthermore, the storage medium could be used to store other information for its owner, such as homework assignments, photographs, music or shortcuts to favorite online websites.

The Entertainment System website for providing this virtual world is a site where children and other toy owners that own an appropriate toy can adopt and care for their virtual toy (e.g., "virtual pets"), play games, and go on adventures, as discussed above. After registration, the user can begin to enjoy the complete 'game' in the virtual world, which is a combination of caring for the toy, going on fun adventures, being surprised by rollovers and trivia, and generally having interesting and entertaining experiences. It is a multi-faceted world, rich in amusement and learning opportunities, including both audio and video (graphics, animation, photos, etc.) representations.

Figure 8A:
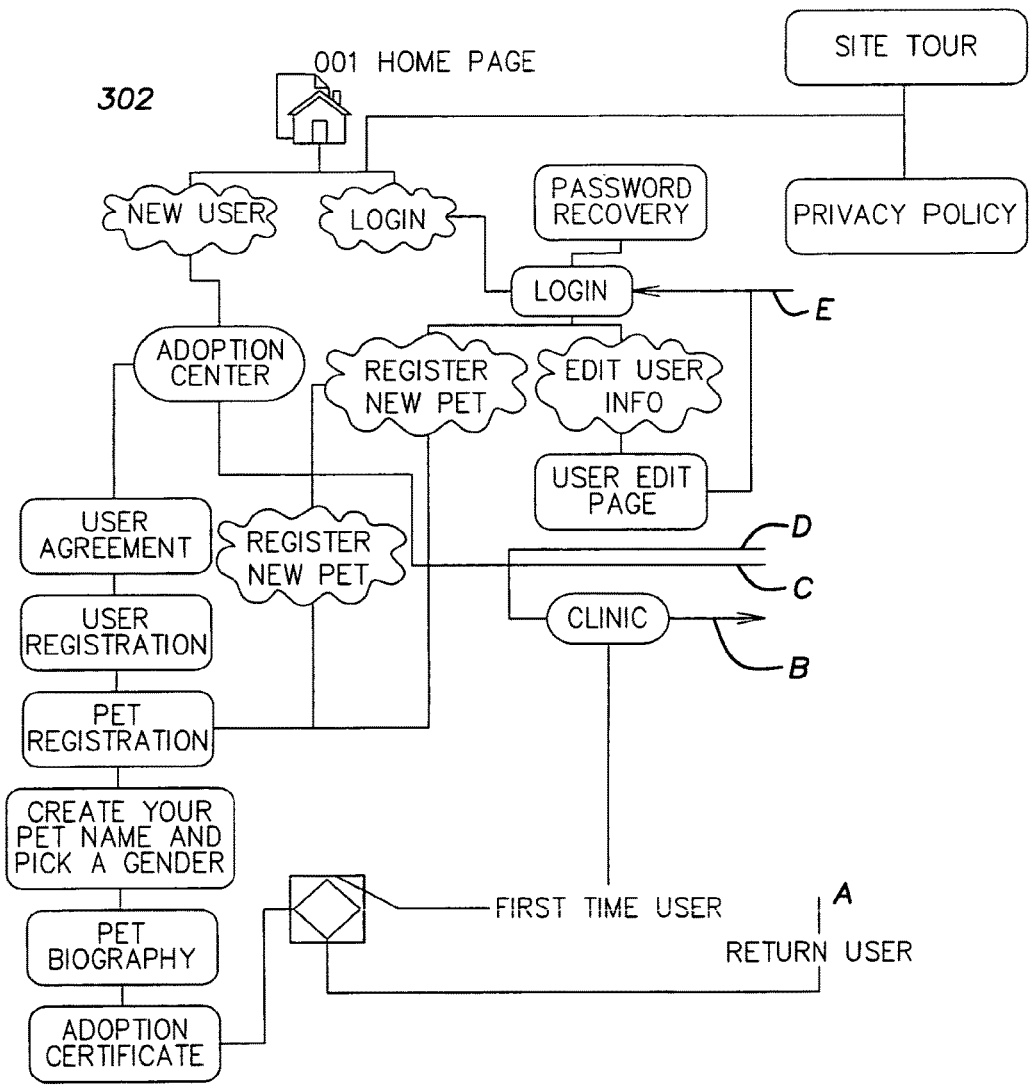
FIG. 8A-8G show the features of FIG. 8 in more detail.
Figure 8B:
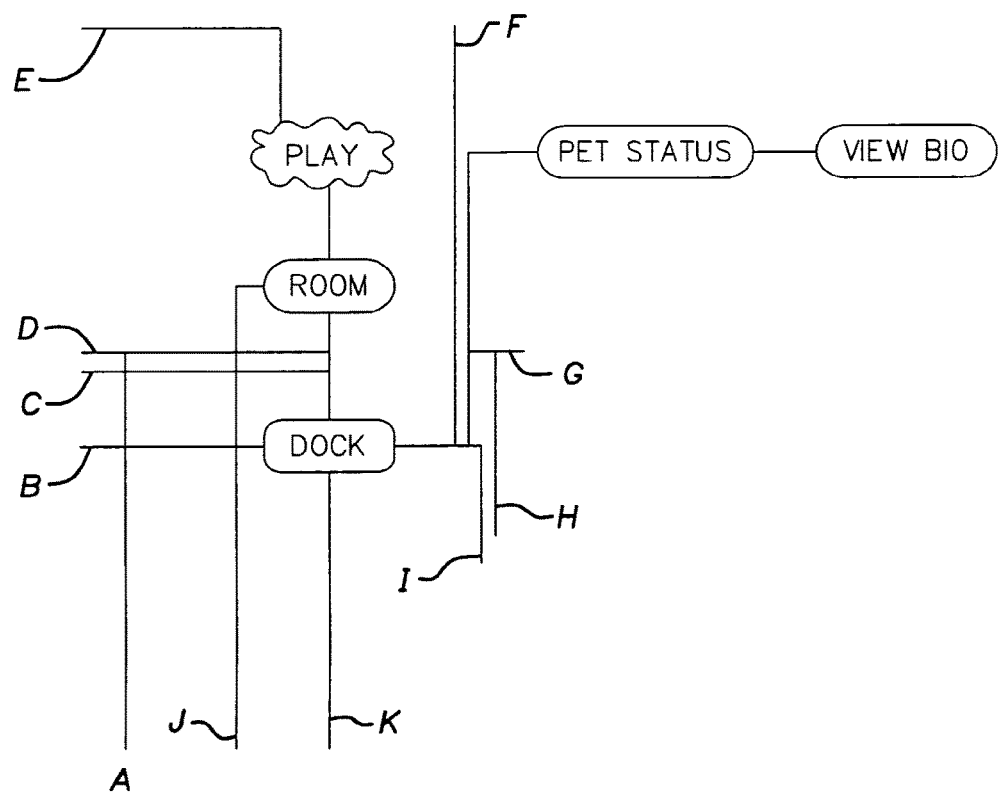
Figure 8C:
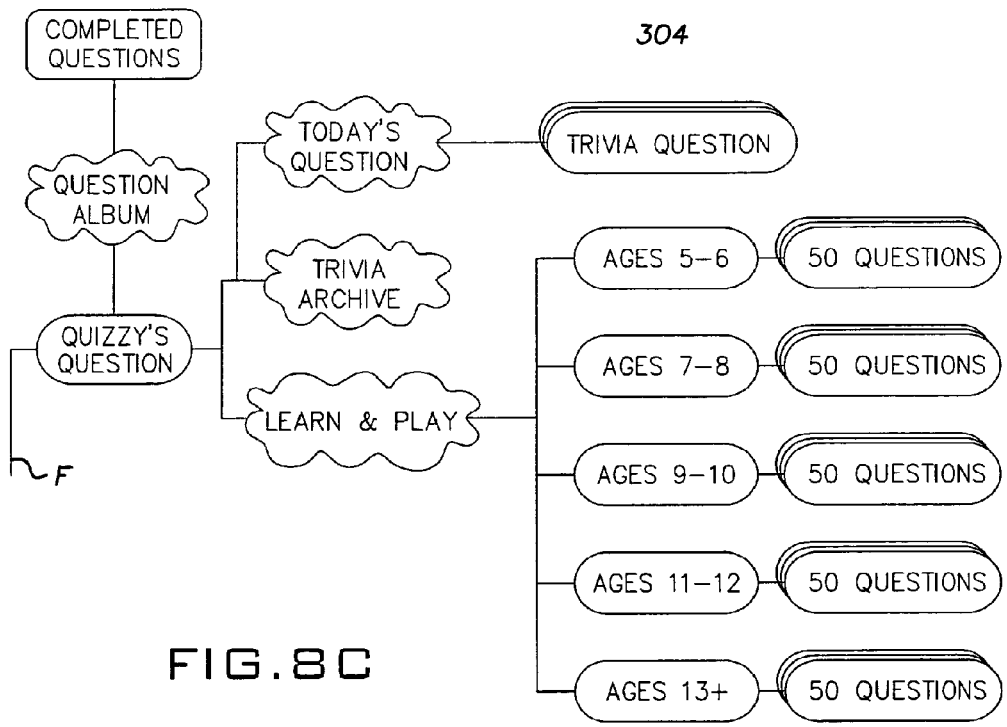
Figure 8D:
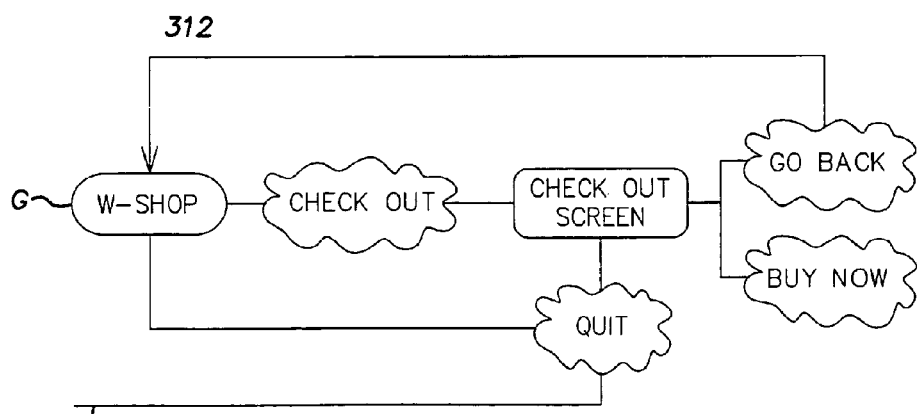
Figure 8E:
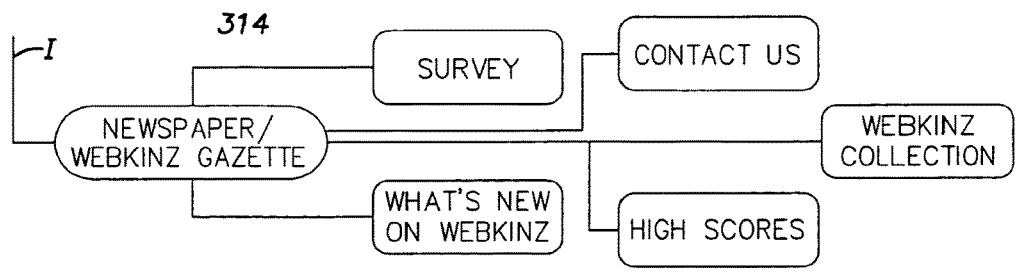
Figure 8G:
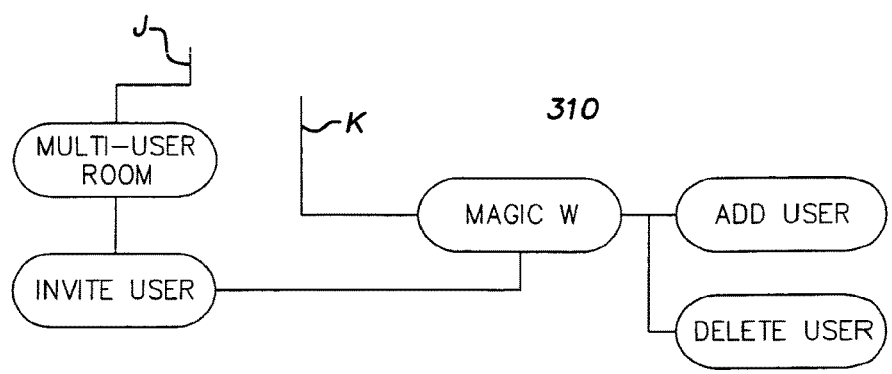
Figure 8F:
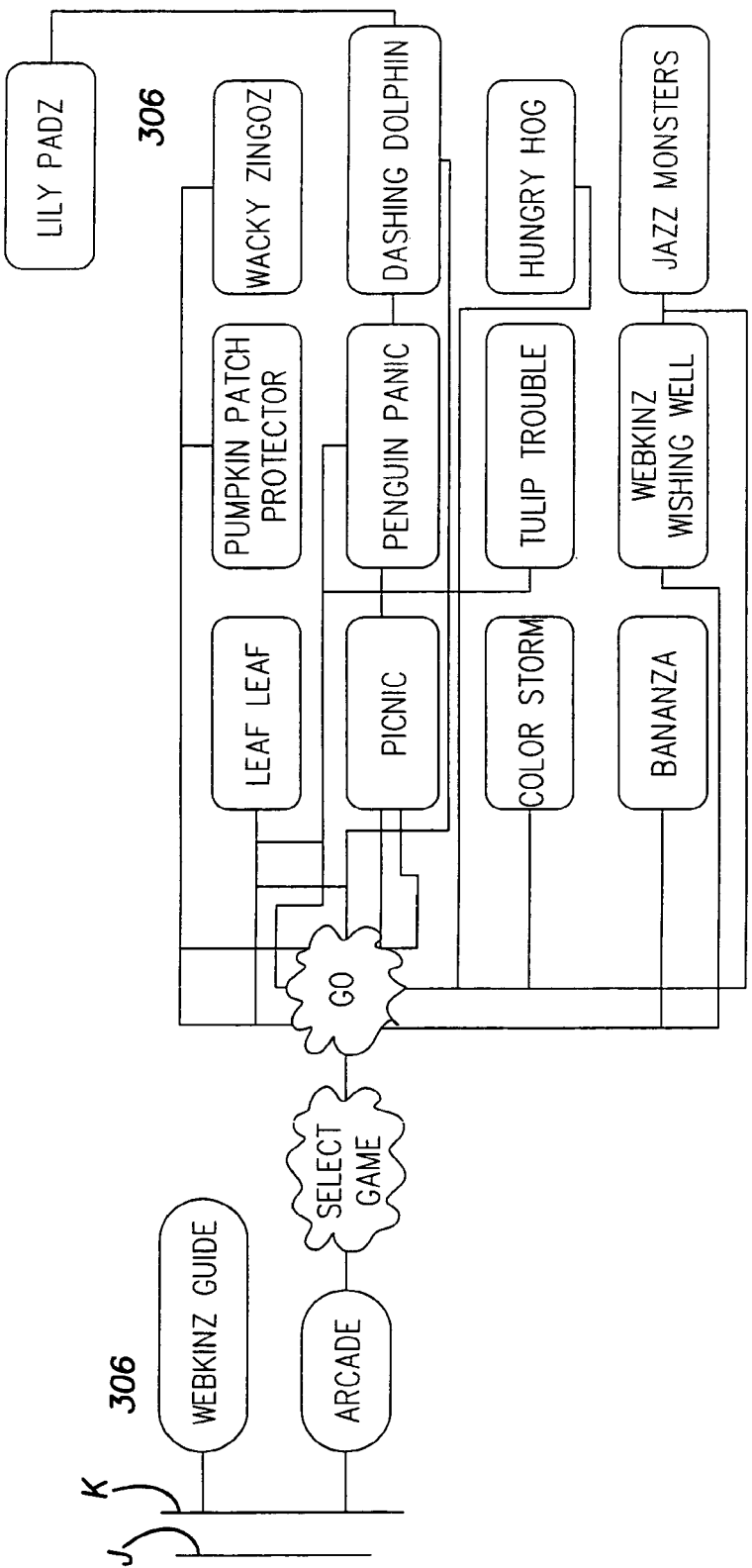

In the current embodiment, there are about 7 or more main sections to explore in this virtual world. FIG. 8 provides a top-level view of the various features, with more detail shown in FIGS. 8A-8G. FIG. 8A provides a mapping of the home page, public pages, adoption center, and registration functions 302. FIG. 8B provides a mapping of the pet virtual room, status, dock, and biography functions 308. FIG. 8C provides a mapping of the Trivia/Question Corner functions 304. FIG. 8D provides a mapping of the shopping functions 312. FIG. 8E provides a mapping of the newspaper functions 314. FIG. 8F provides a mapping of the Arcade functions 306, and FIG. 8G provides a mapping of the multi-user functions 310.

Some of these functions and features of the current embodiment, all of which utilize parts of the software of the Computer Program Listing Appendix, and are described in more detail, below:

Home Page

This section is preferably open to the public, whether an animal has been purchased or not, and features one or more Splash movies, for example. The options presented on the home page include: a Site Tour, Collection(s) portraits—plush and virtual—of each toy animal in the collection(s), access to the Free Arcade, as well as User Log On, and Entrance to User Registration. This section can encourage a person to purchase a toy if he has not yet done so for access to other site locations. See FIG. 11A for the screen shot of the example Home Page, and FIG. 11B for the example logon page.

Adoption Center (AC)

In the AC, the user is guided through the registration process, with the help of the host, Miss Birdie, for example. A User Agreement is presented here. Each user fills in "adoption" forms here, including choosing his or her user name (or "special name") and password ("secret word"). The user enters the multi-(e.g., nine) digit alphanumeric code found on the hang tag of the toy that will authenticate his or her toy, and provide them access to the final steps of registration/adoption. See FIG. 11E for the example adoption center page.

In the current embodiment, the user is given an initial amount of "virtual cash" in order to begin "virtual furnishing" the room, purchasing "virtual food" for the toy, etc., as described in more detail above and below.

In an alternative embodiment, the user chooses the color of the toy's room, and also might choose a number (e.g., five) of free items for the toy's room. Finally, the adoption is completed with the presentation of a unique biography for the toy, randomly generated using many variables. Users have the option of changing the name of the toy, and perhaps generating a new biography.

Clinic

After the successful registration of the toy, the user is brought to the clinic for a check-up/familiarization. The host for this page is a virtual doctor (e.g., Dr. Quack), who gives the virtual toy a quick check-up and gives it a clean bill of health. A user may return to the clinic at any time, for another check-up or when virtual toy's health parameter is low. If the toy requires medical attention, the user chooses and purchases medicine, for example. Other treatments may also be provided. See FIG. 11D for the Example clinic page screen shot.

Toy's Room

The virtual toy's room is made up of a series of animated (e.g., Flash based) screens that depict the virtual room or rooms where the toy "lives", "eats" and "plays". In the current embodiment, a single isometric view of the room is provided. The virtual room can, in time, be converted into a large virtual house or even multiple virtual houses, through the use of room expansions via spending the virtual cash, for example. In the current embodiment, the user can purchase virtual flooring and virtual wallpaper or paint, and virtual furnishings, to prepare the virtual room for the virtual toy. See FIG. 11C for the screen shot of an example virtual pet room already furnished, showing an animated pig as the virtual pet.

Virtual outdoor yards, that have their own virtual furniture and exclusive virtual objects (i.e. trees) that cannot be placed inside the house, for example, can also be provided for "purchase" using virtual cash.

In the current embodiment, a user interface section located at the bottom of the window known as the "dock", or "Control Panel" is provided, as shown in the example virtual room screen shot of FIG. 11C, showing the dock at the bottom of the screen shot. The user may virtually store many or all virtual purchases, collectibles, and adventure objects in the dock, (some of which are functional, such as a virtual calculator for example) or place them throughout the room by dragging them from the dock. The dock displays a visual description of the virtual toy's well-being parameters (e.g., a numerical index), as the toys need food and attention to remain healthy and happy. Also in the dock are the user's points level, and available "virtual cash" earned in virtual games and adventures that can be used throughout the site.

In an alternative embodiment, there might be a number (e.g. 3) of views of the room, and each scene might be accompanied by the dock.

If the user has multiple registered virtual toys, the dock interface will allow the user to switch between toys and view them when not in use. Furthermore, a plurality of virtual toys might be moved into a room for interactive play, for example.

Further, the user can add friends to a friends list, and then the friends can virtually visit each other's rooms, each seeing the same room and playing with their virtual toys, both interacting with the room objects, and chatting using a chatting tool, for example. In the current embodiment, the chatting tool can use "chat symbols", for example, rather than using typed words, so that pre-defined phrases can be chosen and transmitted to the other participant.

In an alternative embodiment, users would be encouraged to revisit be receiving daily rewards, such as an 'allowance' or pieces of a puzzle that can be put together, or one piece will be put in the puzzle box every day, thus encouraging users to revisit.

Figure 11F:
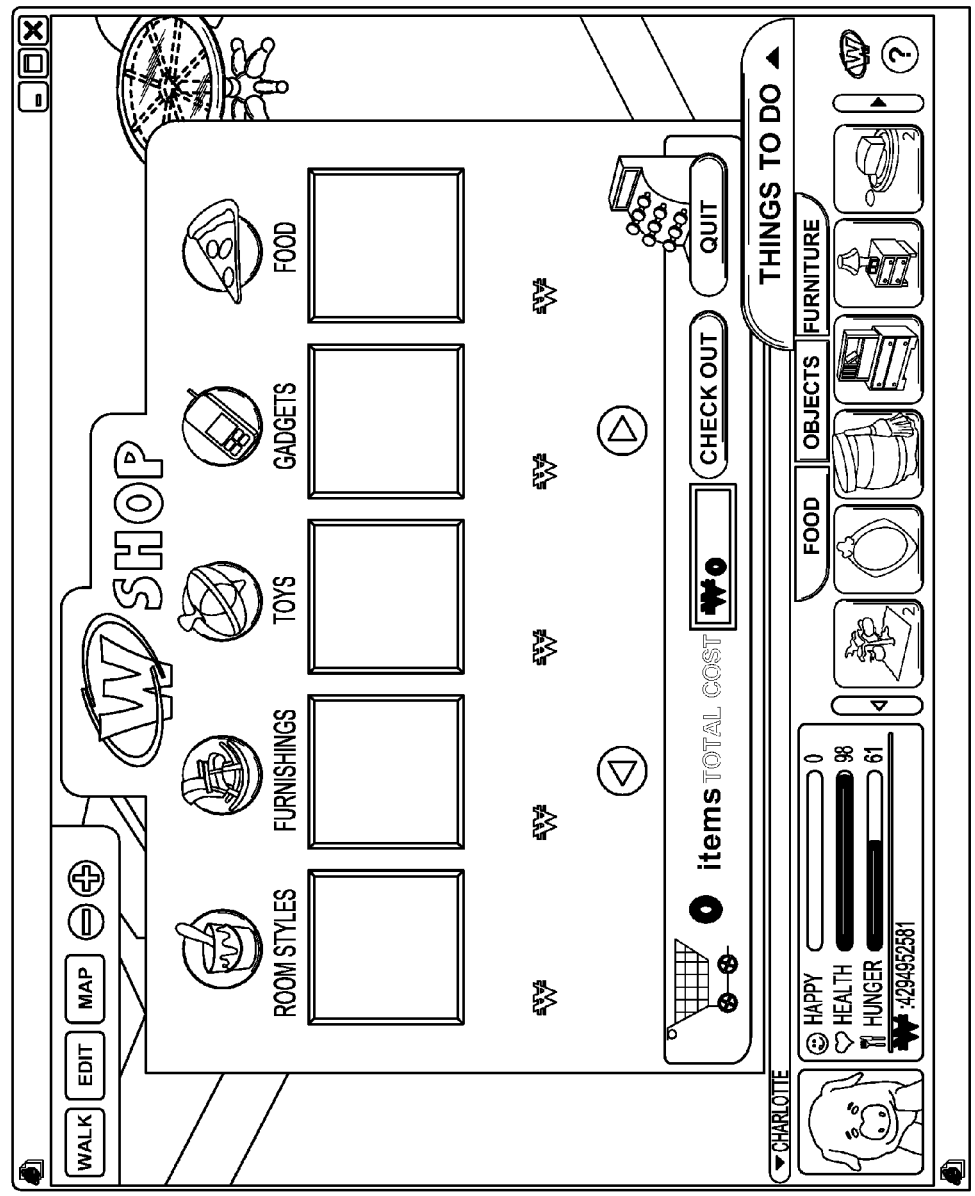

In the current embodiment, a user can go virtually "shopping" using the computer in a dedicated shopping location/room (e.g., at the "WShop"). This simulated virtual shopping experience allows the user to simulate the purchase of virtual online goods for their virtual toy(s). An example screen shot of the W shop is shown in FIG. 11F.

Furthermore, real-life shopping for additional physical toys and/or their accessories, such as via mail-order, might also be supported.

A Family Album, which may be available from the dock, for example, can be used to contain all the important documents including one or more of:
- a•Birth Certificate
- an•Adoption Record
- a•Biography If the user has multiple toys, all records can appear in the album.

Arcade

Figure 11G:
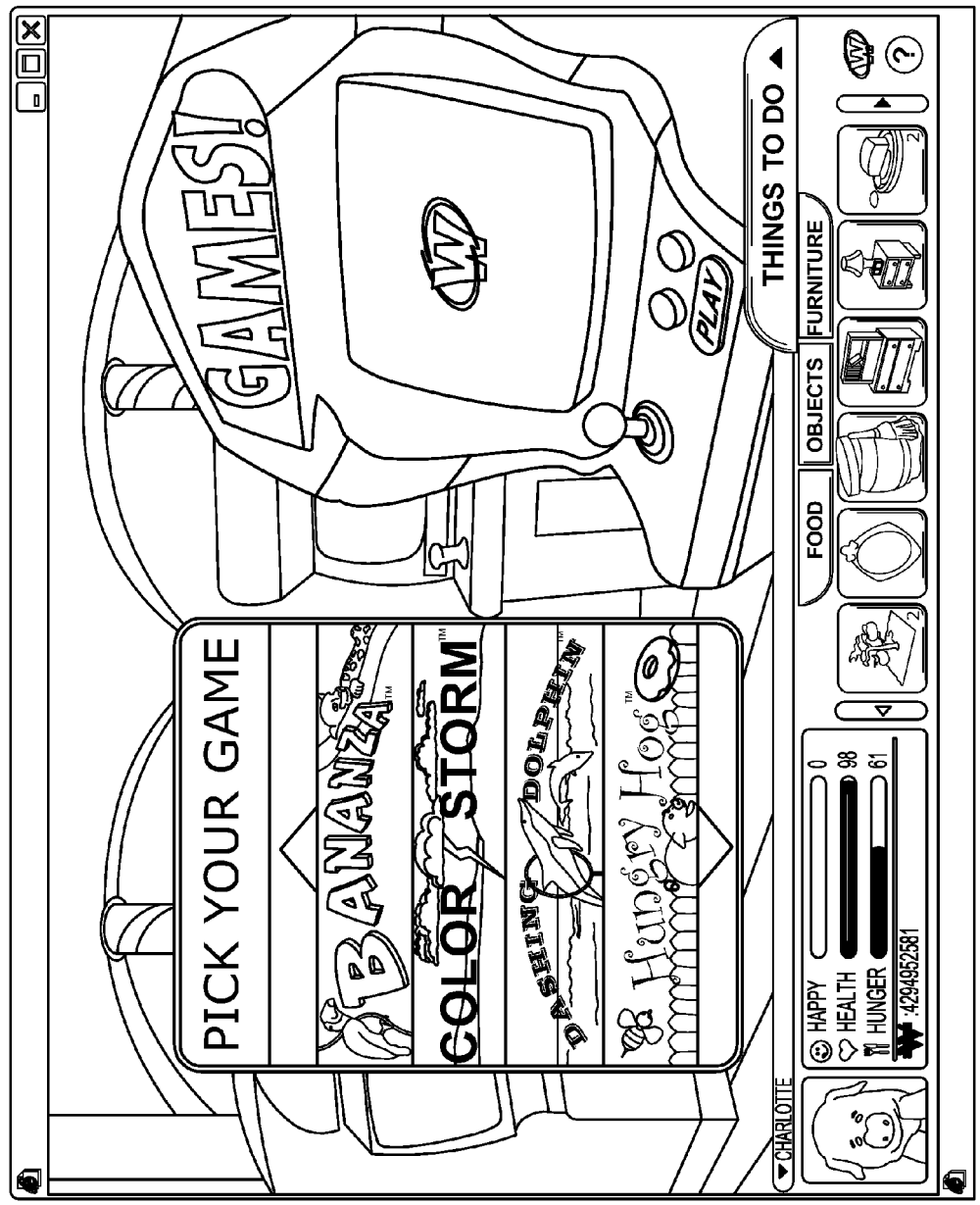

The arcade is a collection of online games for the user to play via the user computer. The user can "take" his or her toy to play some of the games games, which in turn provides them with happiness points for their happiness parameter, and allows the user to earn online virtual cash. In the current embodiment, registered users may have full access to all games, with full access requiring the purchase of a toy with the accompanying registration code and registration, although in an alternate embodiment, the arcade may be made open to the general public with limited access to some limited number of the games. FIG. 11G shows an example screen shot from the Arcade.

Examples of Arcade games in the current embodiment are: Bananza; Color Storm; Dashing Dolphin; Driving School; Tulip Trouble; Jazz Monsters; Leaf Leaf; Lily Padz; Icecap Adventure; Picnic; Hungry Hog; Pumpkin Patch Protector; Webkinz Wishing Well; and Wacky Zingoz, for example.

Clubhouse

In an alternative embodiment, a virtual clubhouse is provided which is a virtual location which houses important community information. The blackboard displays statistics, such as high scores ranking for games. The usernames, or a subset of the user names (such as the first three letters, for example), of the high scores can be listed. The System website may provide users with the opportunity to provide feedback through a suggestion card interface at the Clubhouse, for example. There may also be an online survey, or Poll, area that allows administrators to poll the community's members on various topics.

Webkinz Gazette

Figure 11H:
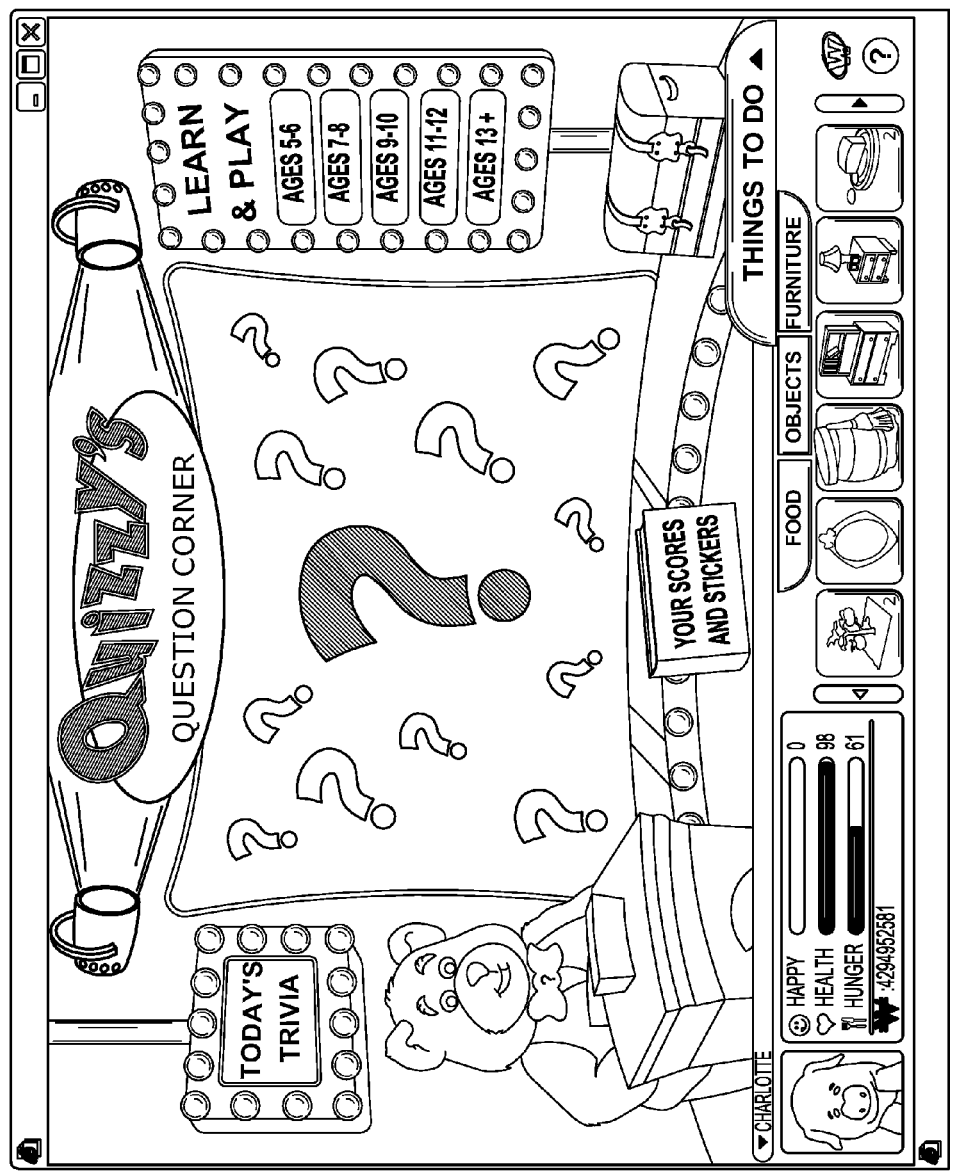
Figure 11I:
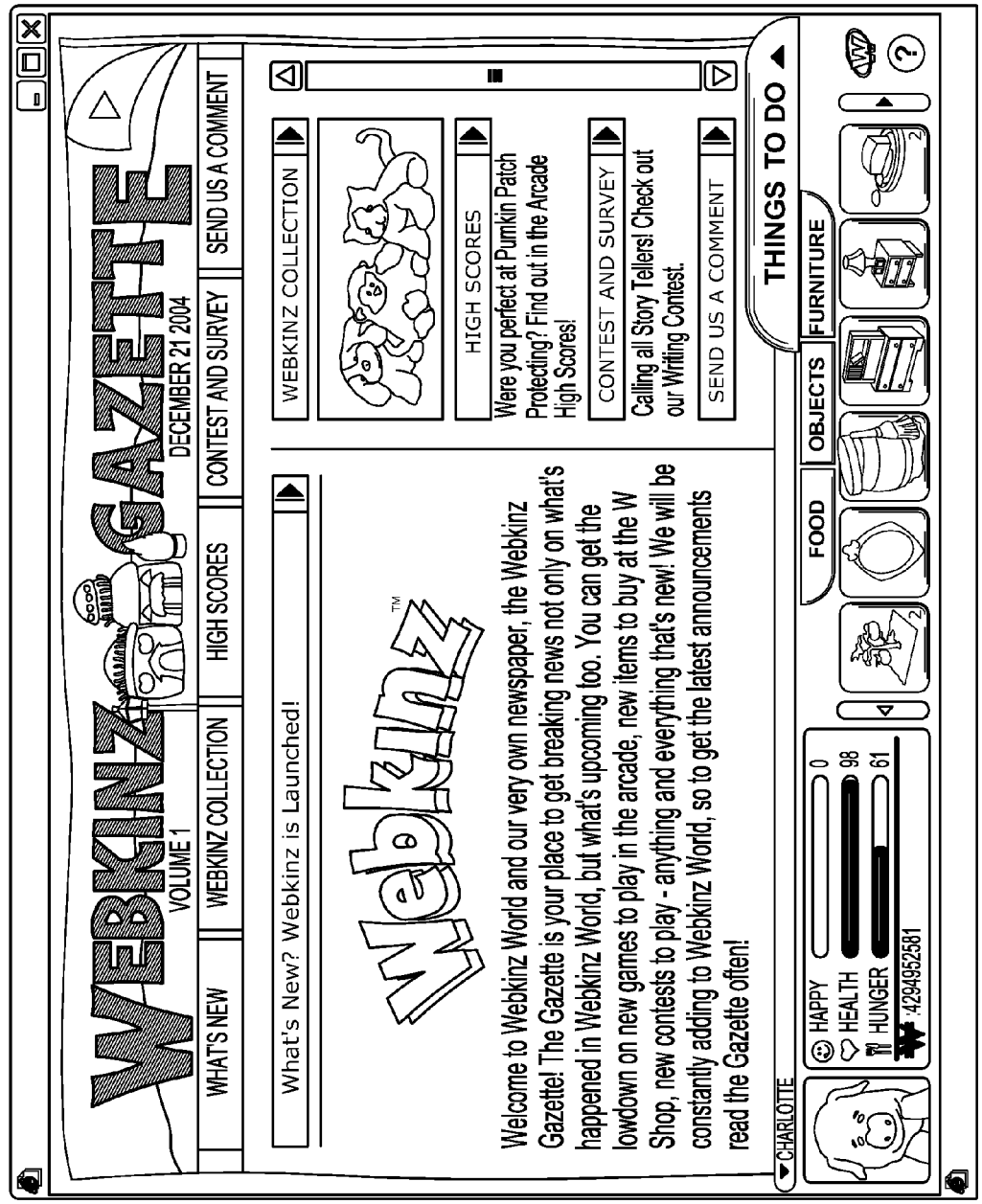
Figure 11J:
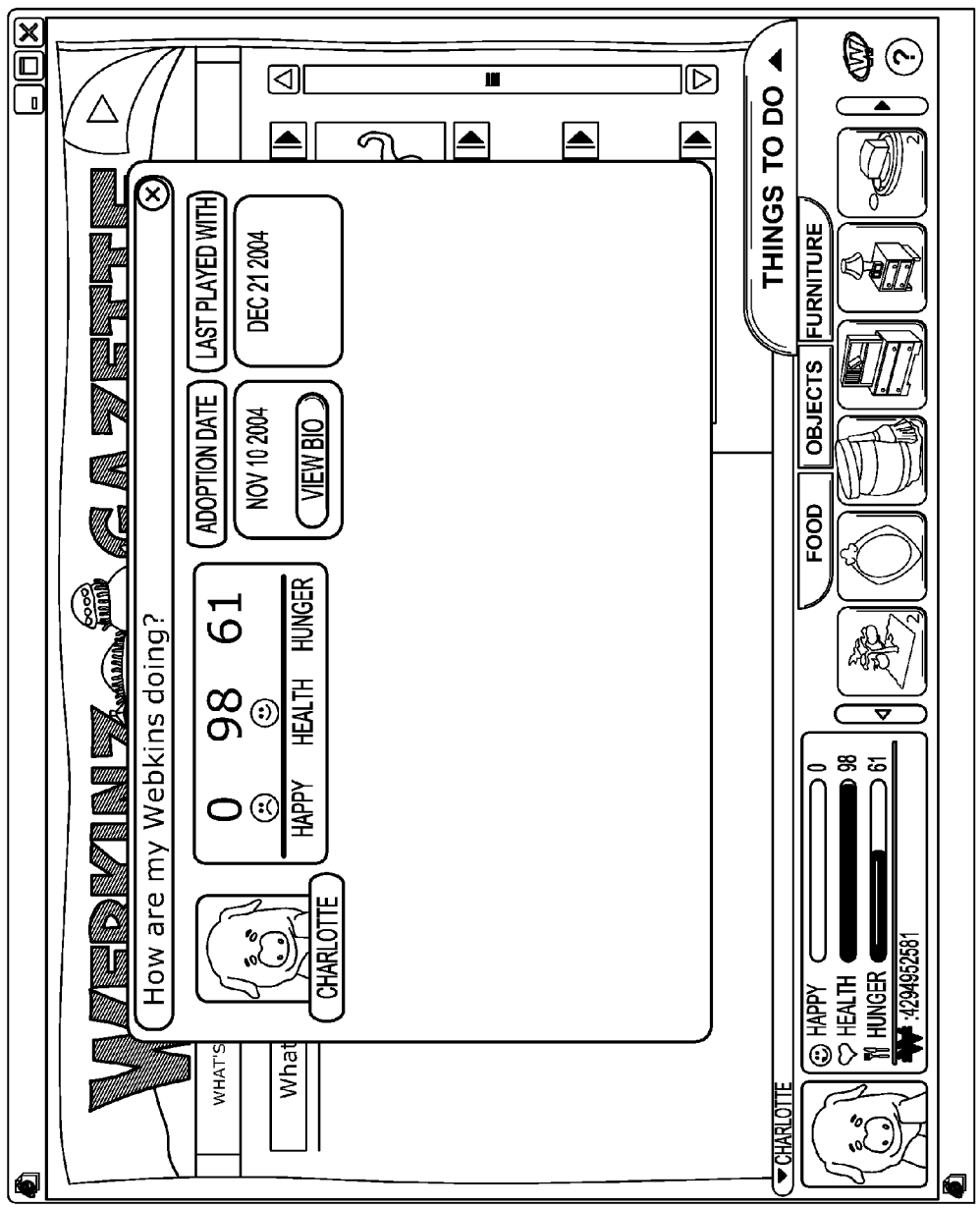
Figure 12A:
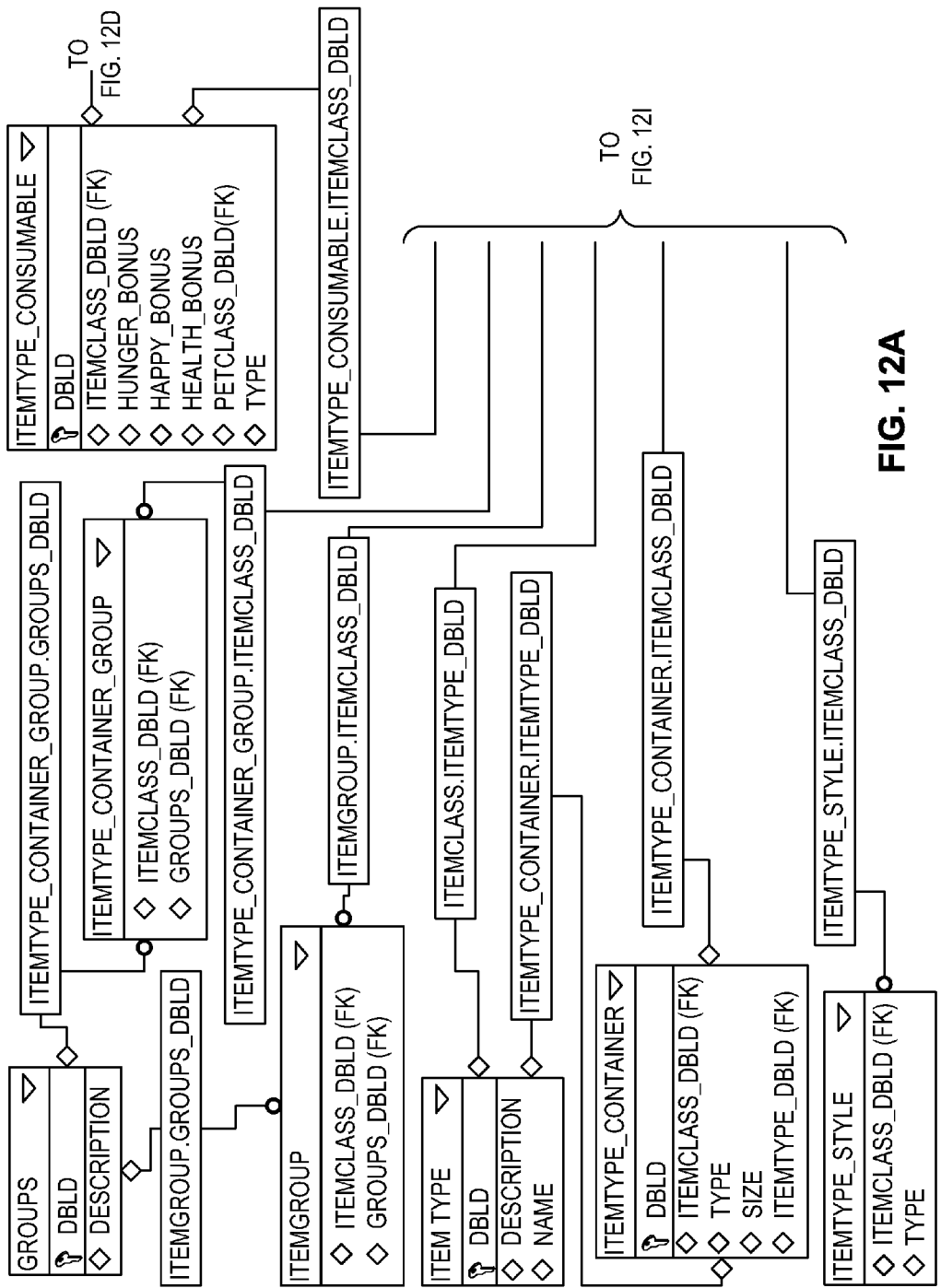
Figure 12B:
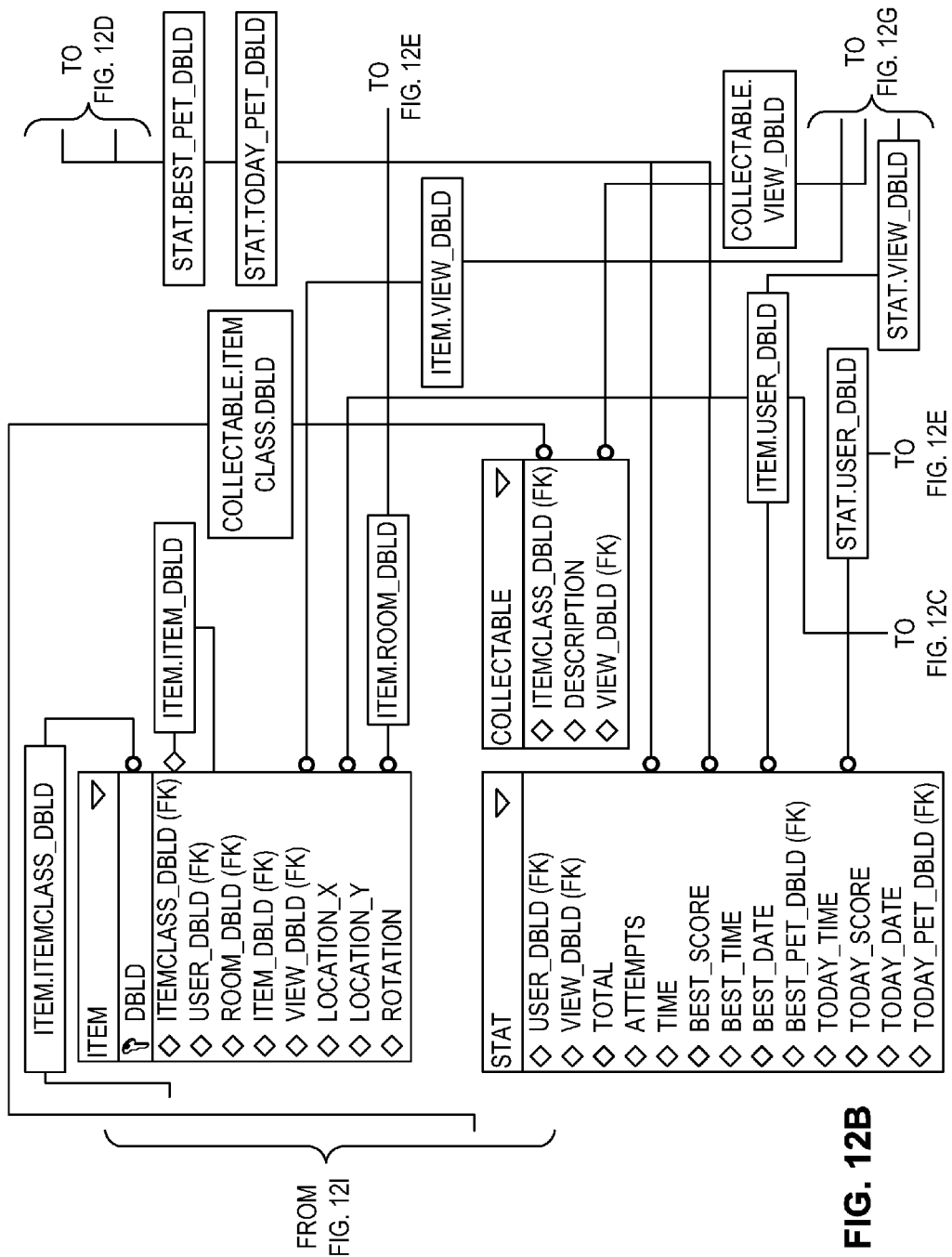
Figure 12C:
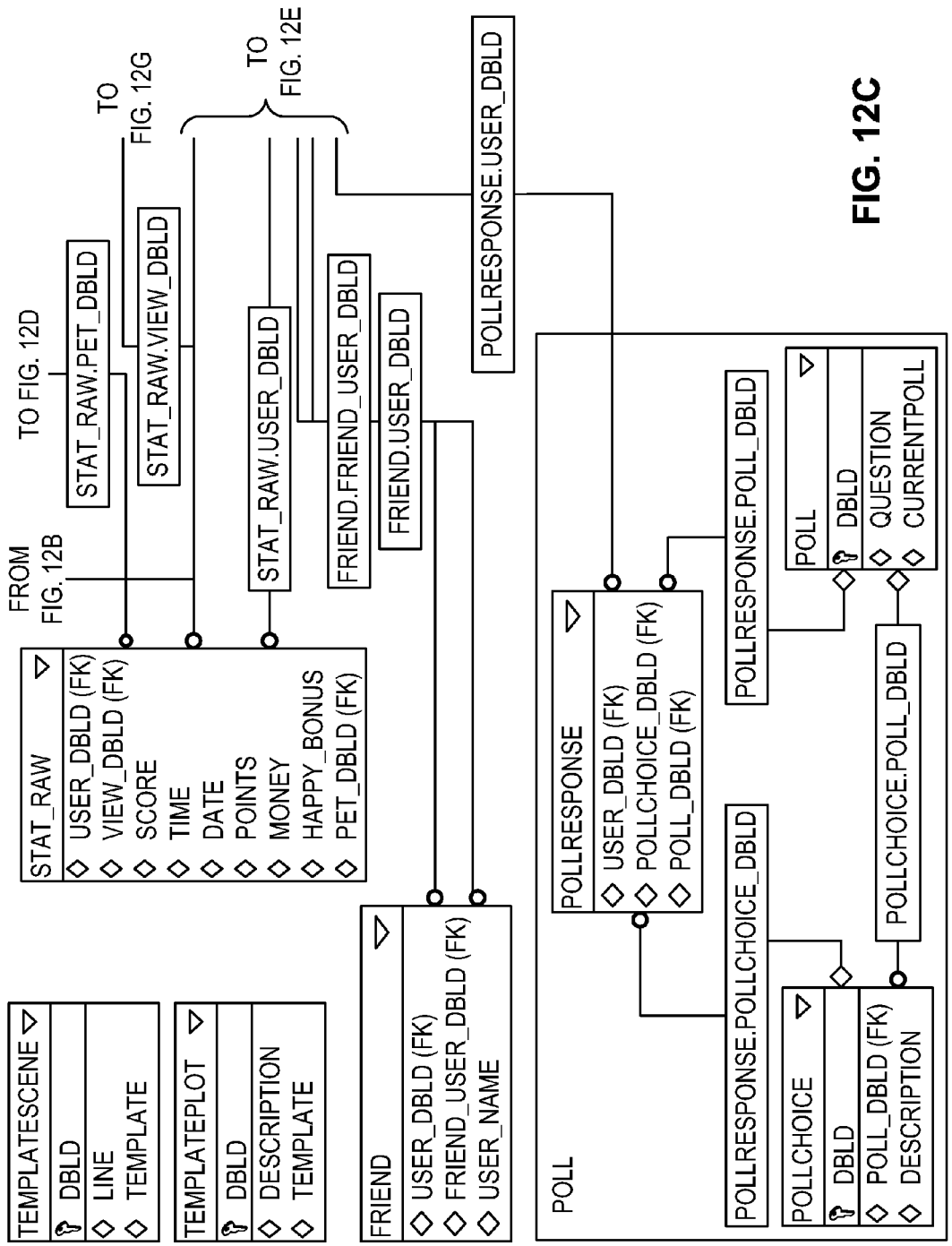
Figure 12F:
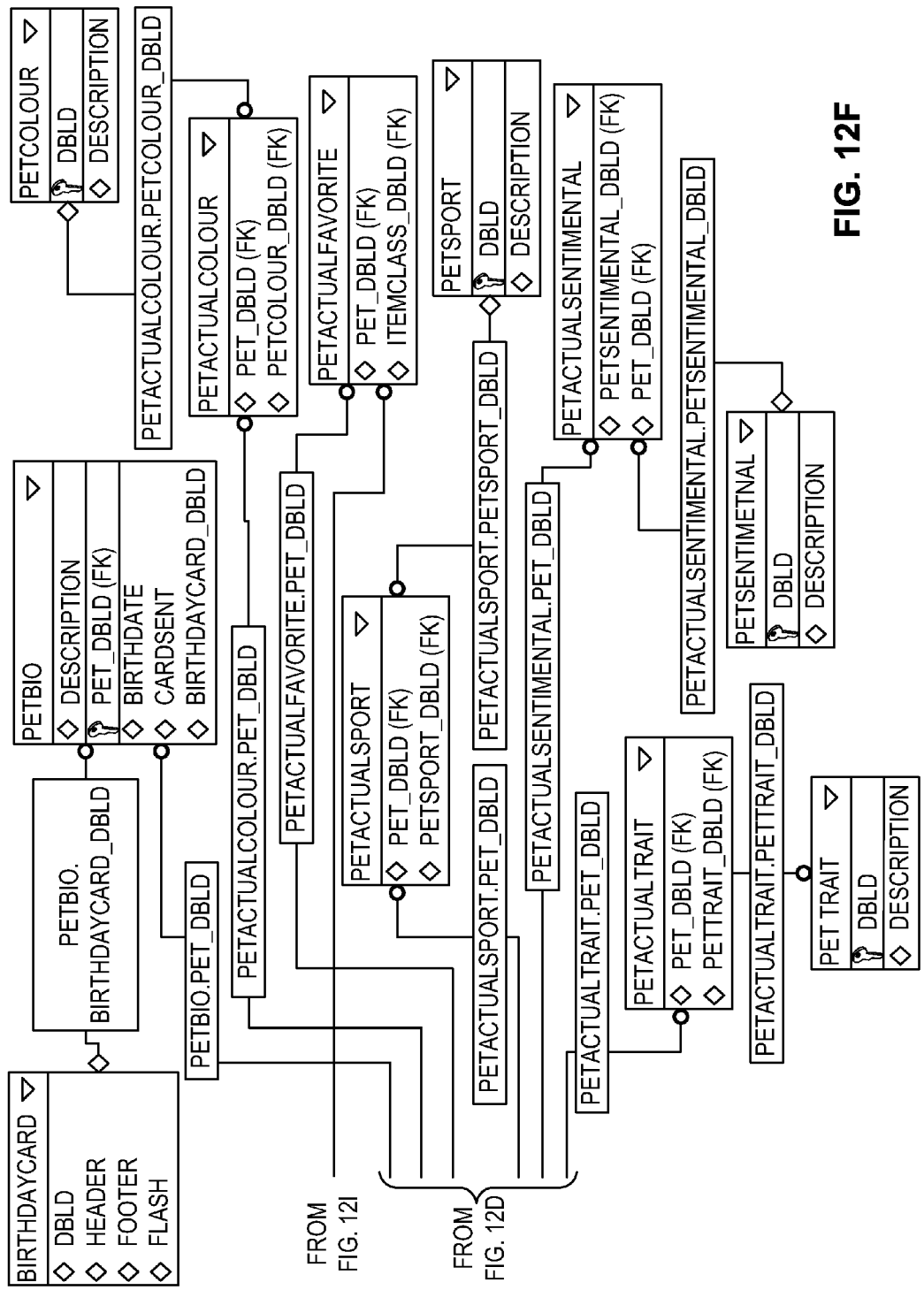
Figure 12H:
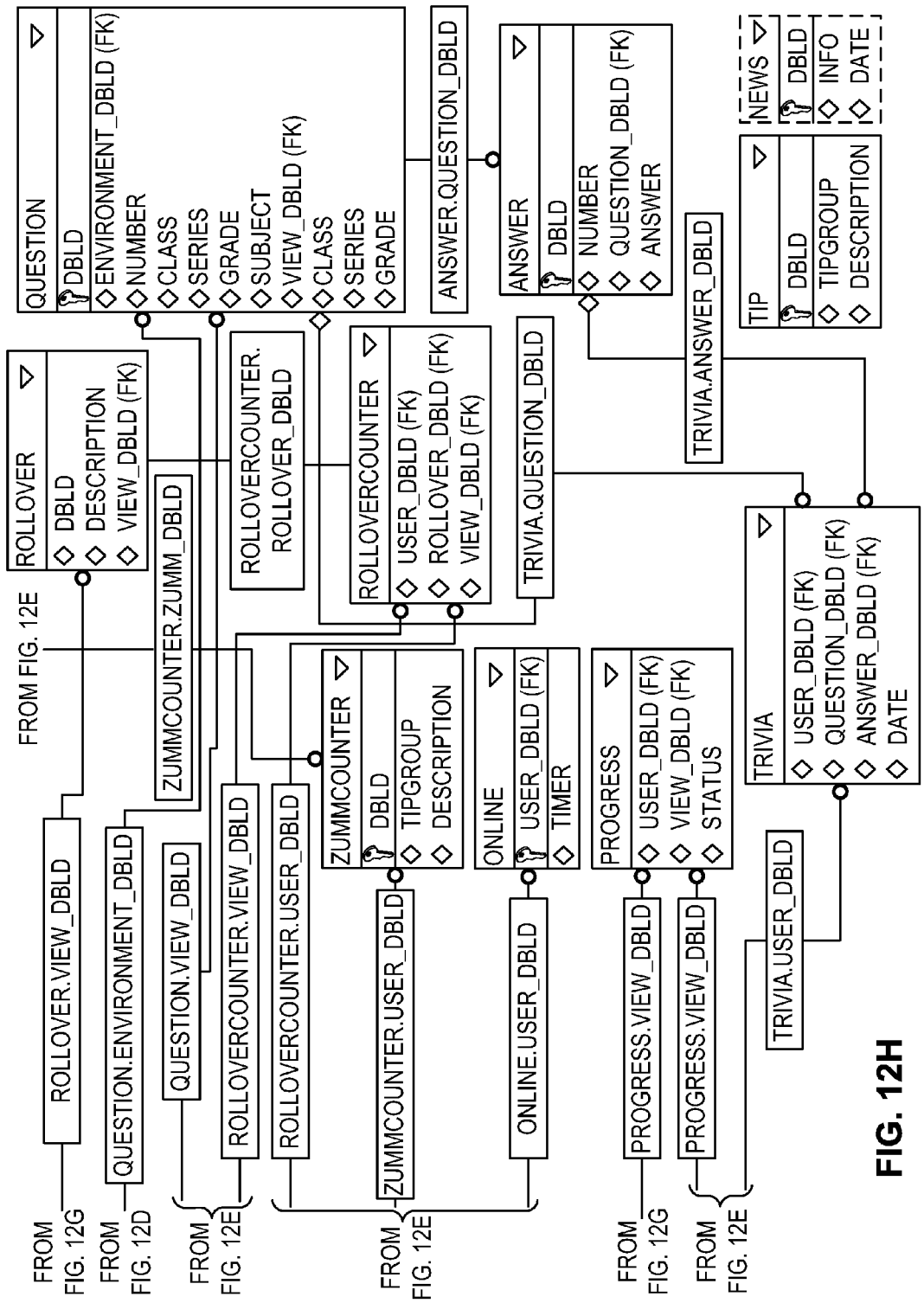
Figure 12I:
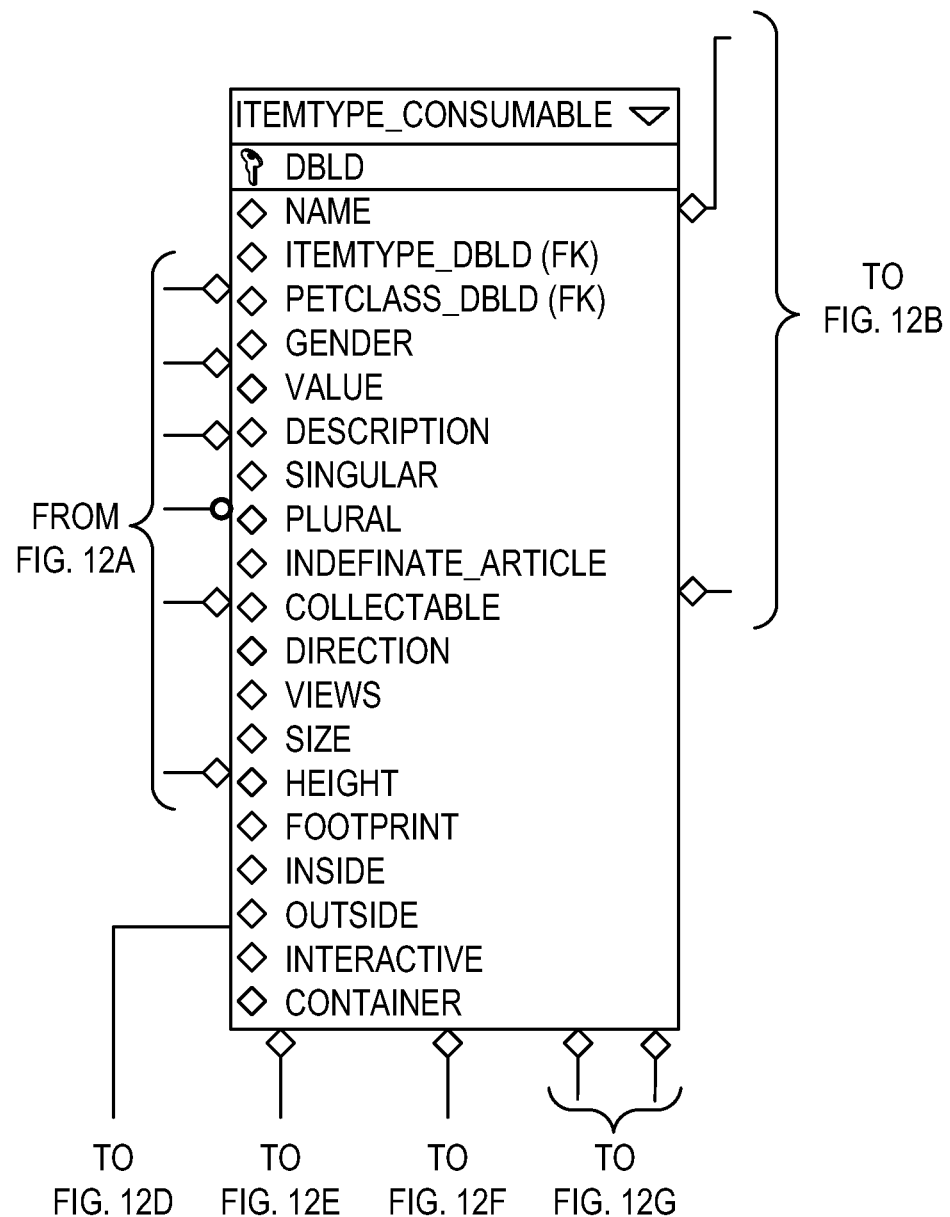

In the current embodiment, most of the features of the above Clubhouse are provided in a virtual Newspaper (e.g., Webkinz Gazette) providing news and information, including a "What's New" section that informs users of the latest additions to the site. The virtual paper might also list the usernames (or the subset of the usernames) of the users with the high scores in various arcade games and/or trivia, for example. FIG. 11I shows an example screen shot of a page of the Gazette, and FIG. 11J shows a summary of the virtual pet biography and well-being parameters displayed by a user selecting a call-up.

Adventures

In an alternate embodiment, each virtual toy belongs to one of a number of areas (e.g., Urban, Country, Undersea, Jungle), with a corresponding Adventure. Each adventure area can consist of a large isometric map in four quadrants, and detailed scenes for playing games. The map is constructed in a maze-like fashion that allows the user to explore the different areas of the environment. The map is embedded with rollovers, pop-ups, trivia questions, and various virtual collectible objects that the virtual toy can pick up along the way. Within the map, there may be five or more extended play areas (the "scenes") that allow the user to play games that provide virtual prizes and clues to aid them in completing the adventure. Upon completion of the initial adventure, the user acquires a special virtual key. There are a number of virtual keys (e.g. four keys) in total, one from each adventure area in the series. As a bonus for recovering all of the keys, the user is granted access to a "Wonder World", or "WW". (See below.)

Adventures can be an important part of play at the website. The game could involve a number of separate environments (e.g. four). Initially, each adventure takes place only in the designated environment (e.g., Jungle, Undersea, Urban and Country). Every adventure involves points and/or virtual cash. The virtual cash is useful in the virtual World as the users can make virtual purchases for their toys. In an alternative embodiment, after the user buys a number of toys (one from each environment, for example) and registers them and successfully completes the adventures, he or she can go to another (e.g. fifth) environment called the Wonder World (WW).

Each additional registered toy can add new sections to the adventure areas of the virtual website for the individual user. The only way a user can experience these additions is to buy a new toy, an accessory, or perhaps a service (whether virtual or actual—both can be supported). This will give the toy owner added value and entertainment. If the user has more that one toy from the same environment, they will have the option to go on an "extreme adventure" that combines the use of all owned and registered toys.

Multi-User

Multiple product purchases will be encouraged through access to new features being opened to use once the purchaser has entered multiple registration codes into the system. For example, while the first pet code opens access for the basic features of the site, the third pet code entered on the same account may open access to a virtual pet adventure, and the fifth pet code entered may add a special room to the virtual toy's house, such as a home theatre or tennis court.

In an alternate embodiment, core functionality could also require multiple product purchases, such as multi-use play being only accessible from the magical land of a Wonderworld (WW) that is accessed through the purchase of a set of toys. One of the things the user could get in WW is access to the "Magic W", represented by a giant statue of a 'W' in the middle of WW. When the user gets to the Magic W, they get a virtual ring version of the magic W in his or her dock. This will enable the user to initiate some multi-use activities on the website, among other things.

In WW, there may be a midway full of virtual games, a vast magical virtual land, a virtual puzzle center, and a virtual vector world. This world can be made growing all the time and thus be full of excitement. In the center of it all, is the magic "W". Here, the user can play in a new world that allows them to participate in multi-user games, multi-user adventures, and a user chat interface developed to utilize pre-scripted phrases and symbols, for the safety of the users.

Quizzy's Question Corner"

This is an area for users to answer trivia questions and age-appropriate educational questions based on U.S. and Canadian educational standards. In the current embodiment, the questions can be sorted by age in a "Learn and Play" section and there is a daily Trivia question that is tracked so that a user at anytime can answer the historical daily trivia question. Both sections reward the user with virtual cash and virtual stickers that are stored and viewable in a virtual sticker album. The user can earn virtual cash by correctly answering the questions. FIG. 11H shows an example screen shot from the Question Corner.

The multi-use capabilities of the site are used in the current embodiment to increase user satisfaction. Users can "invite" their friends (other users) over to their room and interact with the room objects together, including playing games. This can occur even though the users may be remotely located from one-another using different user computers. These multiplayer concepts might be brought into the Question Corner and Arcade allowing for competitive play between multiple users.

Some of the features of the current embodiment include the option to offer various additional toys, accessories, and/or services to the user, whether real or virtual, and perhaps entwined with the activities being participated in the virtual world (such as via a game, for example, or a health checkup, etc.). Some of the characters found in the current embodiment are Ms Birdie—The adoption centre penguin; Dr. Quack—The clinic duck; and Quizzy—The Quizzy's Question Corner bear.

The site web pages should be quick to load so as to make it useful and fun. Finally, additional enhancements can be provided for additional benefits. For example, some information on the toy might be stored locally, such as on a USB key, which can be carried by the user and used to access the site from various locations.

The Computer Program Listing on CD ROM made a part of this application provides the preferred code at the time of its generation for implementing the above system on a web server as is known in the art. The features and functionality of this code are incorporated herein by reference.

The invention has been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The invention claimed is:

1. A toy comprising:
a toy body formed in a shape resembling an animate object;
an electronic storage device coupled to said toy body, said electronic storage device storing registration data that is useable for automatically registering said toy on a computer server that is separate and remotely located from a user computer to which said toy is operatively coupled, said electronic storage device further storing information identifying a network address of the computer server to which the registration data stored by the electronic storage device is to be transmitted by the user computer over a communication network for registering said toy; and
a communication part coupled to obtain data that is stored in said storage device, and operative to communicate said data over the communication network directed to said network address when coupled to the user computer;
said electronic storage device storing information that is communicated using said communication part, and including said registration data that is operative for connecting over the communication network directed to said network address and automatically registering said toy on the computer server and for establishing access information that can be used to gain access to a restricted portion of a website without requiring additional entry of the registration data, wherein said electronic storage device is configured to be automatically read in response to being introduced to the user computer to communicate the information identifying the network address for transmission over the communication network, wherein the information identifying the network address transmitted over the computer network results in content being retrieved to allow the user to participate in a registration process using the user computer to customize at least one attribute of a virtual character to be controlled by the user in a virtual environment hosted by the computer server or a different computer server that is also remotely located from the user computer.

2. A toy as in claim 1, wherein said registration data is a unique code that is uniquely indicative of a single toy.

3. A toy as in claim 1, wherein said communication part is coupled to said communication network via a user computer.

4. A toy as in claim 1, wherein said storage device is further adapted to store at least one of information received from said computer server or information received from a user of the toy.

5. A toy as in claim 1, wherein said communication network is the Internet.

6. A toy as in claim 1, wherein said electronic storage device is operative for automatically registering using said registration data, over the Internet.

7. A toy as in claim 1, wherein said storage device stores updated data associated with said virtual world that is different than original data stored in said storage device, wherein said updated data includes an online profile of a virtual character that is associated with said toy on the computer server.

8. The toy as in claim 1, wherein said communication network is the Internet and said network address as a website address.

* * * * *